July 16, 1946. W. S. GUBELMANN 2,404,170
CASH REGISTER
Original Filed Jan. 22, 1929    12 Sheets-Sheet 1

INVENTOR
WILLIAM S. GUBELMANN
BY
ATTORNEYS

July 16, 1946.　　W. S. GUBELMANN　　2,404,170
CASH REGISTER
Original Filed Jan. 22, 1929　　12 Sheets-Sheet 2

FIG. 2

INVENTOR
WILLIAM S. GUBELMANN
BY
ATTORNEY

July 16, 1946.  W. S. GUBELMANN  2,404,170
CASH REGISTER
Original Filed Jan. 22, 1929  12 Sheets-Sheet 3

INVENTOR
WILLIAM S. GUBELMANN
BY
ATTORNEYS

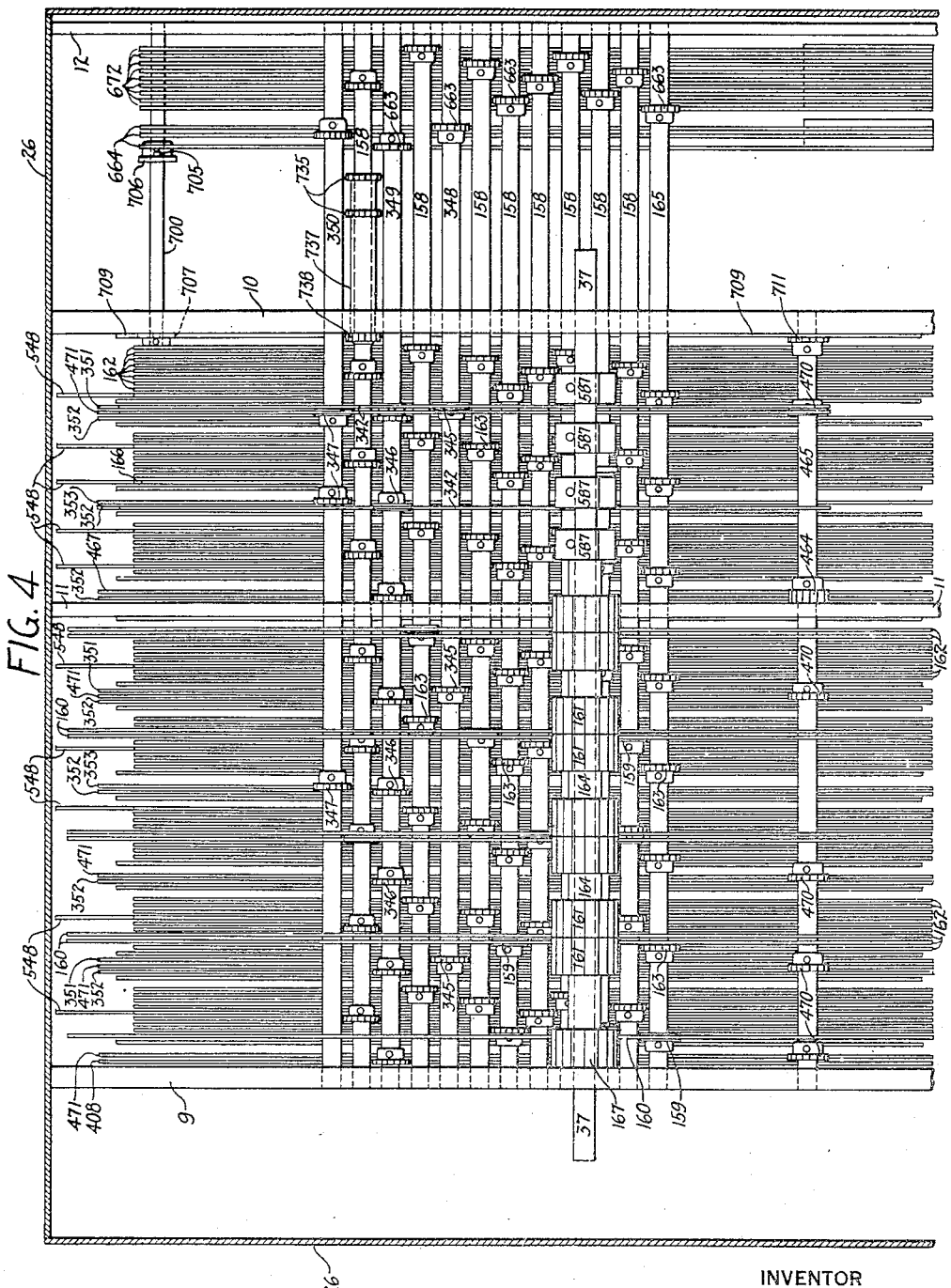

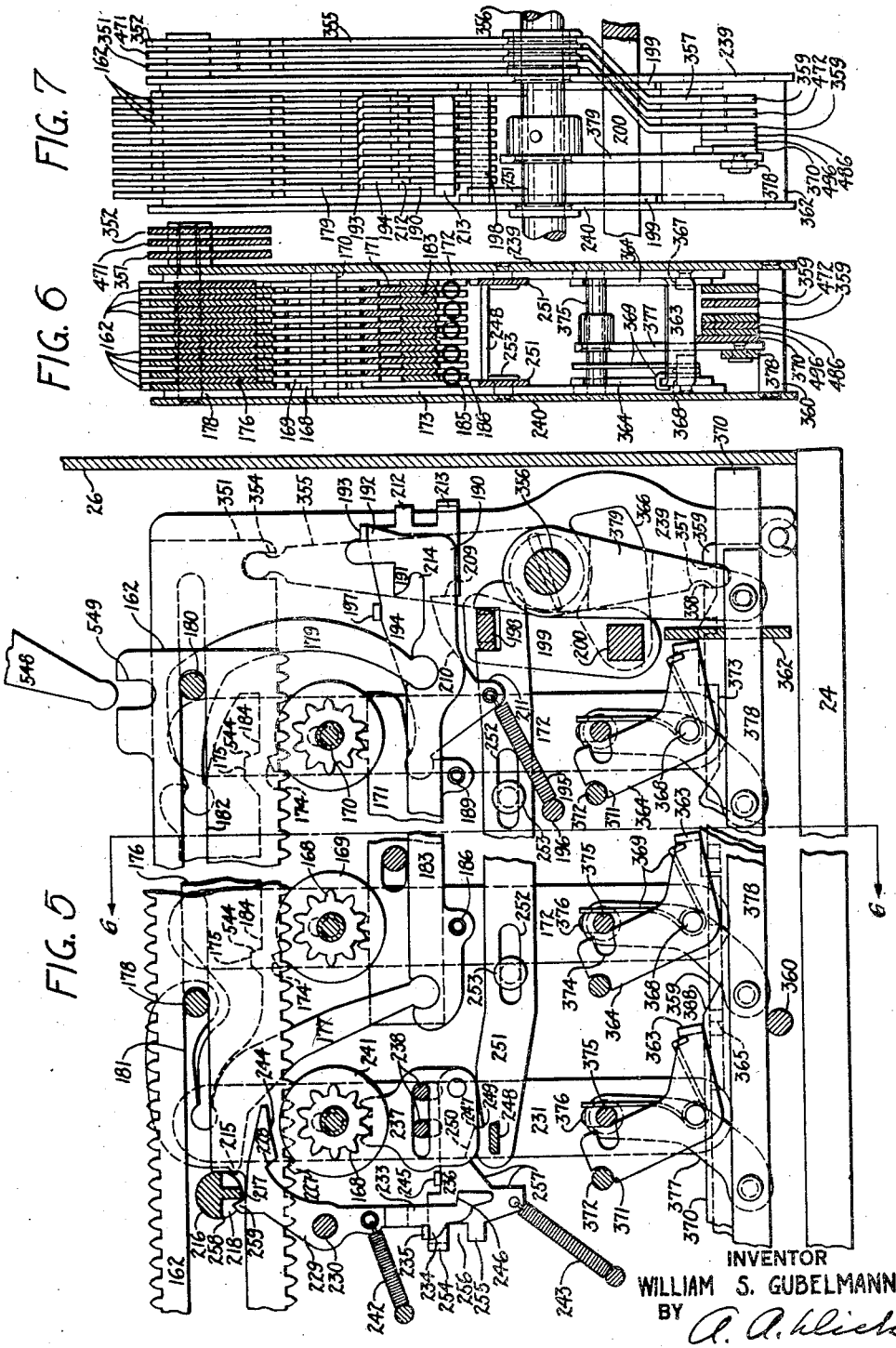

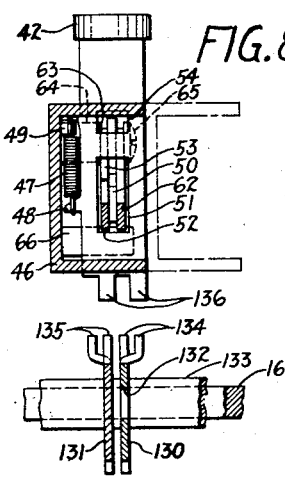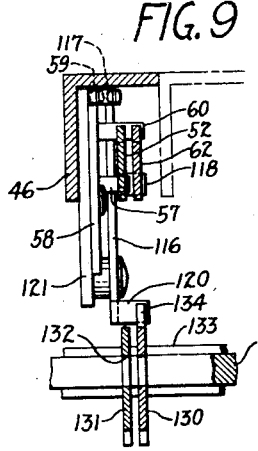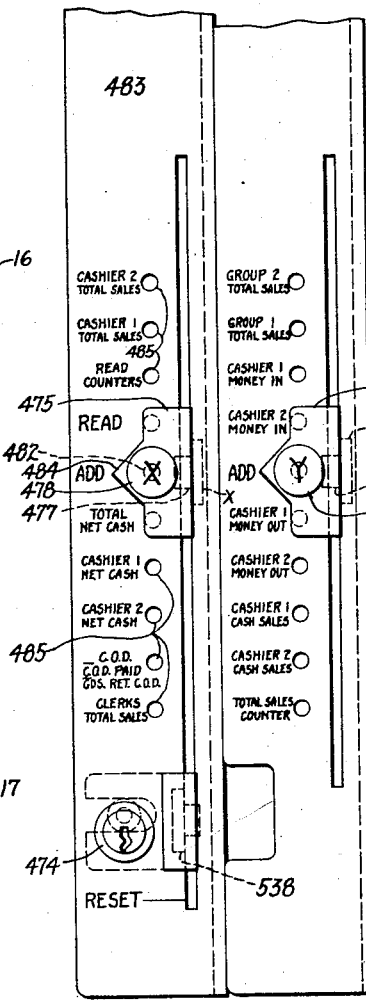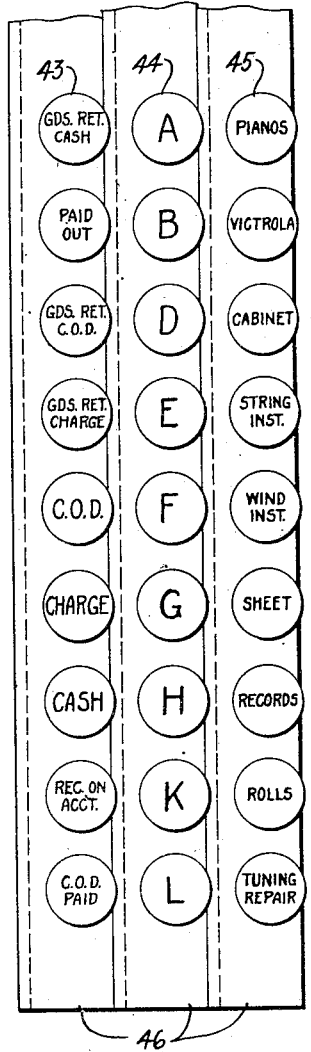

INVENTOR
WILLIAM S. GUBELMANN
BY
*A. A. Klicke*
ATTORNEYS

July 16, 1946.  W. S. GUBELMANN  2,404,170
CASH REGISTER
Original Filed Jan. 22, 1929   12 Sheets-Sheet 8
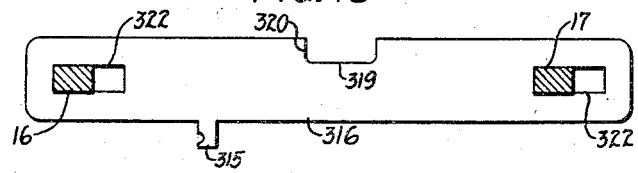
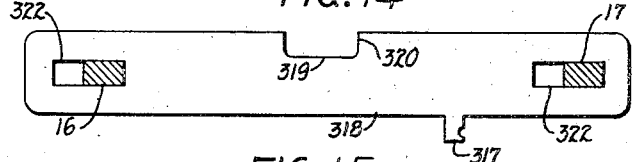
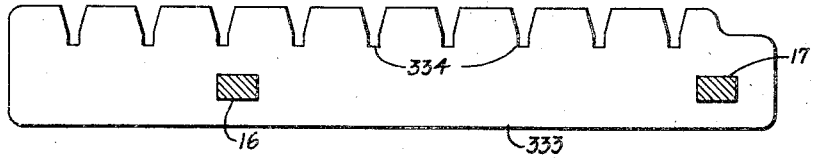
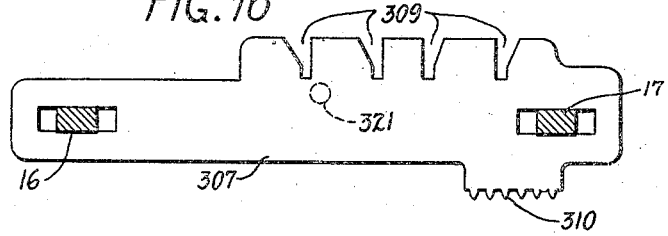
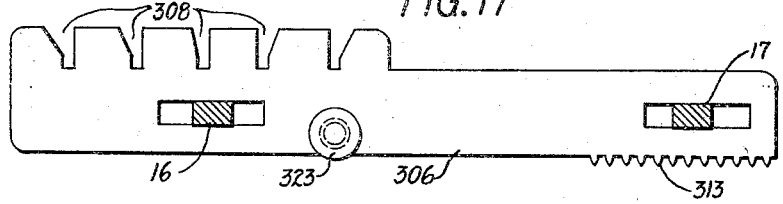
INVENTOR
WILLIAM S. GUBELMANN
BY
ATTORNEYS

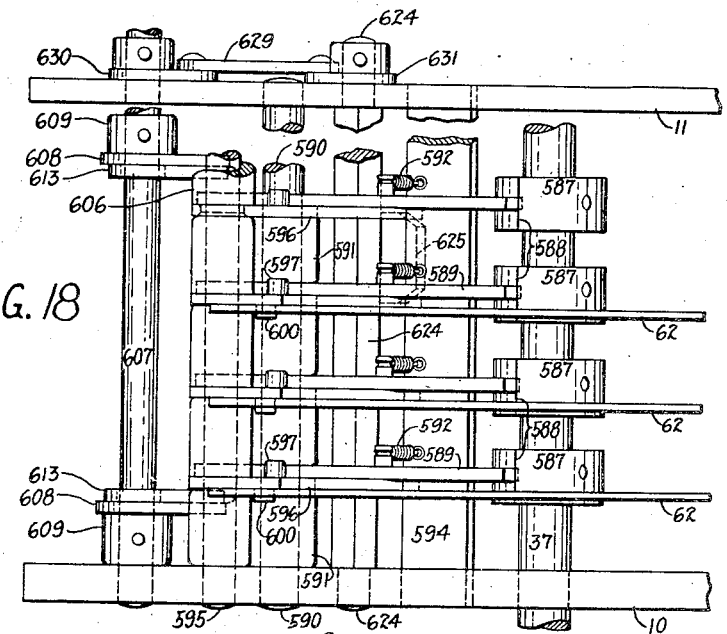

July 16, 1946.  W. S. GUBELMANN  2,404,170
CASH REGISTER
Original Filed Jan. 22, 1929   12 Sheets-Sheet 10

INVENTOR
WILLIAM S. GUBELMANN
BY
ATTORNEYS

July 16, 1946. W. S. GUBELMANN 2,404,170
CASH REGISTER
Original Filed Jan. 22, 1929 12 Sheets-Sheet 11

INVENTOR
WILLIAM S. GUBELMANN
BY
ATTORNEYS

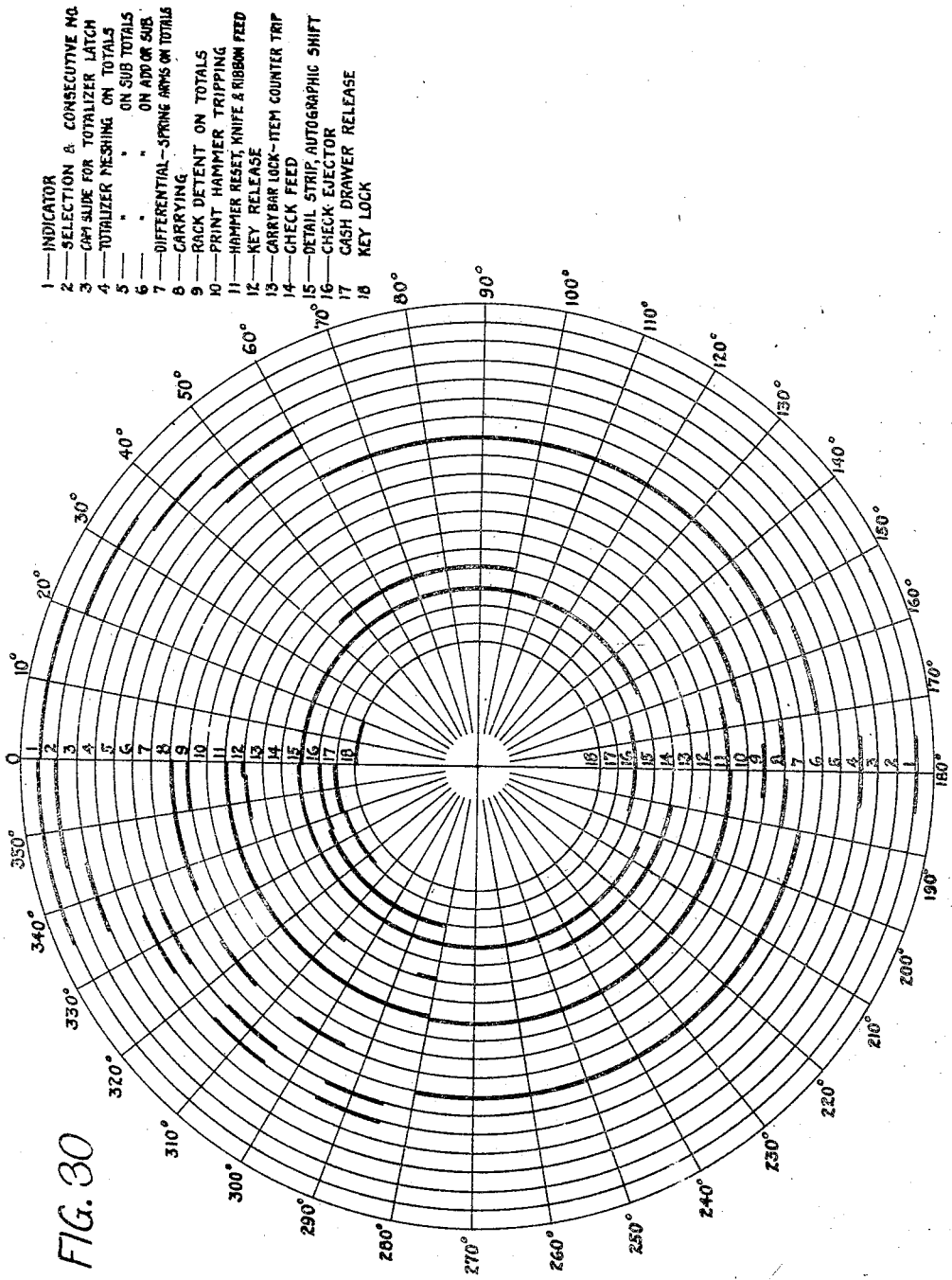

Patented July 16, 1946

2,404,170

UNITED STATES PATENT OFFICE 2,404,170

CASH REGISTER

William S. Gubelmann, Convent, N. J.

Original application January 22, 1929, Serial No. 334,160. Divided and this application June 11, 1940, Serial No. 339,951

4 Claims. (Cl. 235—130)

This invention relates to cash registers and particularly to locking and interlocking mechanism for such machines, this application being a division of applicant's application S. N. 334,160, filed January 22, 1929, Patent 2,226,919, December 31, 1940.

A primary object of the present invention is to provide improved interlocking mechanisms adapted for use in the machine illustrated in said patent and in cash registers of various types as well as other machines in which interlocking mechanism is useful. Reference is made to said patent for a more complete understanding of the machine as a whole.

In accordance with the invention, it is intended that a plurality of totalizers shall receive each item entered in the machine, the selection of the particular totalizers to receive an item being placed under the control of a plurality of sets of keys or equivalent devices.

In the illustrative machine of said patent, which will be described hereinafter in detail, three groups of selecting keys, including 27 keys in all, are adapted to variously select one or more of 43 totalizers upon each operation of the machine.

It has therefore been an important object of the present invention to so construct and arrange the totalizers and counters as to permit the accumulation of a series of individual totals as well as the counting of the items entering into these totals in accordance with several different classifications represented by the different groups of special selecting keys. In addition totalizers have been provided for the accumulation of grand totals of different combinations of these individual totals, or portions of such individual totals; while still other totalizers have been provided for maintaining a constant balance of certain factors of interest in connection with sales. For this latter purpose a plurality of adding and subtracting totalizers are included. The construction of this phase of the mechanism is such that, in accordance with the combination of special keys depressed, one or more of these adding and subtracting totalizers may be selected for operation either additively or subtractively while others remain neutral. The determination as to whether an item will be entered additively or subtractively in these totalizers is entirely automatic and the mechanism for accomplishing this result is effective in such a way that one totalizer may be added upon while the other is simultaneously subtracted from.

The particular form of applicant's novel totalizer selecting mechanism disclosed in the said patent embodies a series of movable slide members each of which may be shifted to any one of ten positions to exert different controls. The construction of this mechanism is such that the selection of a particular totalizer for actuation calls for the adjustment of all of the slides related to that totalizer to what may be termed an affirmative position. If a single one of these slides should be in a position to negative the selection of the particular totalizer, then the totalizer will not be engaged with the actuators.

The simplicity with which the machine may be converted from an item entering condition to a totaling condition with respect to any one of the totalizers constitutes another improved feature of the present invention. Due to the fact that there are more totalizers in the machine contemplated than there are special totalizer selecting keys and, due to the fact that the selection of some of these totalizers calls for a joint control from two or more keys or similar members, it has been found desirable to provide the present improved cash register with a plurality of total controlling members. These members are preferably so constructed that they may be moved manually to any one of a plurality of positions and when any member is moved to any position, other than normal it will condition the machine for the taking of a total instead of the entering of an item. In certain positions of these members definite totalizers may be selected for totaling operations, whereas in other positions these members may merely serve to condition the machine for totaling while the selection of a totalizer may still be effected by the regular selecting keys, or equivalent selecting elements. It is contemplated by the present invention to provide suitable interlocks between the members to prevent any attempts to take totals from more than a single totalizer upon one operation of the machine. When the selection of a totalizer for total taking is dependent solely upon the movement of one of the total controlling members it is brought about simply by the appropriate adjustment of one or more of the selecting bars similar to those adjusted under control of the selecting keys.

As a simple and effective way of providing for the resetting of any one of the totalizers, a special key-controlled lock has been included, which in conjunction with either one of the total controlling members will predetermine a grand total or resetting operation of the machine through its effect upon the timing of the totalizer engaging mechanism. Obviously, other means might be provided for modifying the control of the totaling members so as to condition the machine for grand totals instead of sub-totals.

In many constructions of the prior art where provision is made for taking totals from any one of a series of totalizers, it has been found necessary to provide for a two cycle operation of the machine during totaling. This is due to the fact that a considerable period in the operation of the ordinary machine is required for the purpose of selecting a totalizer before it may be engaged with the actuators while its engaging movement must take place, for totaling, prior to any movement of the actuators. According to the present invention, the need for this sort of two cycle operation during total taking operations, has been eliminated. This has been made possible largely by the provision of a new and improved form of differential mechanism associated with the special keys; this mechanism being different from that related to the amount keys. The primary feature of this special differential construction is that depression of one of the special keys serves to directly shift a slide bar differentially in one direction or another to a limited extent, while at the beginning of the subsequent operation of the machine a cam hook is rendered active early in the cycle to position the totalizer selecting parts in accordance with the setting of the differential slide bar. Thus, while a part of the differential movement is initiated upon depression of a special key very little work is required to affect this part of the action. At the same time a very prompt totalizer selection is made possible.

In addition to the two types of differential mechanism already mentioned for the amount and the special key banks, there is provided another differential construction under control of a plurality of locks which may for example be designated cashiers' locks. Differential connections are provided also from the total controlling levers and the resetting control lock which has already been mentioned; the novel features of these mechanisms will become apparent from the detailed description which will be given hereinafter.

A number of novel and effective forms of locking and interlocking devices have been provided for the keys and other operative portions of the machine. Reference may be had to the detailed description and the claims for appropriate designation of the novel features of these constructions.

While an attempt has been made in the foregoing section to enumerate a number of the outstanding improved and novel features embodied in the cash register of the present invention, it will be understood that many other features, too numerous to specifically mention at this point, are present and will become more apparent as the description of the illustrative machine progresses.

*General outline of illustrative machine*

In order that the relation between the various parts, which will be described hereinafter in detail, may be more readily understood a general outline will first be given of the component parts of the machine illustrated in the drawings. While this machine serves admirably to illustrate the important features of the invention it will be understood that the specific application of these features herein given is not intended to be restrictive but various modifications may be made to adapt the machine for innumerable other uses.

It has been found convenient for the purpose of explaining the extreme flexibility in application of the novel features of the invention to disclose them in connection with a machine adapted for use in a large musical instrument store which handles not only a variety of such instruments but a number of accessory items as well. It will be assumed that such a store is divided into a number of departments which may themselves be assigned to one of two groups as for example an instrument group and a miscellaneous group including accessories or miscellaneous items, such as sheet music, player rolls, phonograph records, and repairs. The instrument group may embrace such departments as piano, wind instrument, string instrument, phonograph, and so on.

Each department may have assigned to it a number of clerks although for the sake of avoiding duplication of parts in the disclosure only one clerk will be assumed to be associated with each department. The store may be of such size and conduct its business in such a way that a wide variety of transactions are encountered such as the usual cash, charge, paid out, received on account, and C. O. D. transactions. This type of transactions will necessitate extreme flexibility in the printing feature of the machine in order to enable its coordination with a suitable bookkeeping system. Thus, for cash transactions it may be desired to issue a printed check which may be handled to the customer as a receipt covering his purchase. A charge sale will preferably call for printing upon an inserted sales slip which for convenience should be separable into three units, each bearing the printed amount of the sale and other data such as the date, clerk's initial, department, etc. For received on account transactions it will be found desirable to print upon an inserted statement sheet the amount of and other information regarding the money received. This as contemplated by the present invention may be effected upon duplicate sections of a statement sheet or card adapted to receive successive entries upon successive lines. Transactions may require still other printing conditions, for example a paid out amount may not call for printing upon any form of inserted material or even upon a check. All amounts, however, regardless of the nature of the transaction should be entered upon a detail strip which may at the same time identify the transaction as to type, department, clerk involved, consecutive number, cashier operating the machine, and any desired additional matter which may be entered through an autographic opening.

As intimated in the foregoing the present machine is intended to be operated by either of a pair of cashiers who may be responsible for all transactions occurring during their respective terms of duty. Each cashier, furthermore, may be enabled to control certain identifying and totalizing devices related only to himself in such a way as to prevent any one else from using these devices to produce a false or erroneous entry.

In order that instantaneous totals may be obtainable of a wide variety of items a large number of totalizers are provided and these are related not only to the individual keys assigned to the department, clerks and transactions, but are related as well to combinations of these classes. Thus, for nine departments, nine clerks, and nine transactions, there are provided twenty-seven totalizers arranged in three groups or banks, each containing the nine falling under a particular classification. Since it is only necessary to operate one of the totalizers in each of these groups of nine upon any single operation of the machine, these groups are provided with what may be termed a universal carrying mechanism which has certain parts common to all of the nine totalizers in the group. In addition each of these three banks of totalizers includes a tenth totalizer which is adapted to carry the grand total of the amounts on all of the nine universal type of totalizers in the group, or if desired it may carry some entirely independent total. These grand totalizers are provided with what may be termed individual carry mechanism since each must be capable of operation without regard to any other totalizer. Those totalizers related to the departments and the clerks are adapted in the present disclosure to accumulate only those transactions which represent actual sales. That is, cash, charge, and C. O. D. items, while the transaction group of totalizers will of course accumulate all items of each particular type of transaction. Since the grand total of the clerks' group of totalizers will be the same as the grand total of the department totalizers under the arrangement assumed above only one of the individual totalizers will be used for this purpose. The remaining individual totalizer associated with these groups has, in the illustrative machine, been assigned to one of the cashiers to accumulate the total sales registered by him. Similarly, the second cashier's sales will be entered upon the individual totalizer of the transaction group, since a grand total of all transactions would be meaningless.

A fourth group of totalizers is provided in the machine and this group is of such construction that as many of the totalizers in the group as desired may be operated at the same time. Thus in the group illustrated there are eight totalizers all of which might be operated during an operation of the machine if occasion required it since the transfer mechanisms, while provided with certain common operating devices, are sufficiently independent to permit the proper action for each individual totalizer of the group. In the particular layout adopted for illustration these totalizers are devoted to such items as the total sales registered in each of the two groups of departments, the money taken in by each cashier, the money paid out by each cashier, and the cash sales registered by each cashier. From these designations it will be seen that it will not actually be necessary to operate more than two or at most three of these units upon a single operation of the machine. It will be apparent that the determination as to whether any one of these totalizers shall be rendered effective upon a particular operation is dependent upon the particular keys operated either in the department or the transaction banks as well as upon the state of the pair of cashiers' locks.

A fifth bank of totalizers is further provided for the purpose of handling such combinations of items as may require both addition and subtraction. This bank, as shown, is made to include four totalizers, one of which is devoted to the total cash on hand, while two others are devoted to the cash for which each cashier is to be held responsible, and the fourth is devoted to "C. O. D." items in such a way as to indicate at all times the amount of "C. O. D." business for which collections have not been made. The first of this group of totalizers will be so arranged and operated that it will receive as positive entries all "cash," "received on account," and "C. O. D. paid" amounts, while it will receive as negative or subtractive entries all "paid out" amounts. The selection of this totalizer for effective operation will therefore be dependent upon the particular transaction key depressed and if this key renders the totalizer effective it must at the same time determine its state, that is as to whether it is to be operated additively or subtractively. Substantially the same mode of control must be provided for the two totalizers devoted to the cash of the individual cashiers with the additional requirement that the selection of these totalizers must also be governed by the cashiers' locks. The remaining totalizer of this group will of course be rendered active only when one of the three C. O. D. keys happens to be depressed. Thus if the ordinary C. O. D. key is depressed this totalizer will be selected for additive operation whereas if the "C. O. D. paid" key or the "Goods returned C. O. D." key is depressed the selection of this totalizer will be for subtractive operation. From what has been said it may be noted that as to this fifth bank of totalizers it may be necessary under certain conditions to operate one of them additively and at the same time operate another of them subtractively to the same extent. Thus when a "C. O. D. paid" amount is reported and registered it must be added to the general cash totalizer as well as to one of the cashiers' cash totalizers but it must at the same time be subtracted from the C. O. D. totalizer in order that the latter may represent only outstanding items of this character.

In addition to the foregoing banks of totalizers capable of receiving the variable amounts of the various transactions and some of them either additively or subtractively the machine illustrated is provided with some thirty item counters which are arranged in three banks and are adapted to receive only unitary actuation upon operations of the machine. Those counters are of substantially the same construction as the totalizers of the first three banks mentioned but, as stated, are adapted to receive only unit actuation upon operations of the machine. Twenty-seven of these counters are of the universal carry type and are directly related to corresponding ones of the keys in the three special key banks so that upon normal operations three counters will have a unit added to their registrations. The remaining three counters which are of the individual transfer construction are devoted to the counting of the total number of operations performed by each cashier and the counting of the number of sales made by all of the clerks.

From the foregoing brief outline of the general character of the totalizers and item counters provided in the machine illustrated herein, it will be found that this machine is capable of operating a maximum of eighteen totalizers and six item counters upon a single operation of the machine although due to the particular designation assigned to the totalizers and counters the actual number which will be selected during any normal operation will probably not exceed ten totalizers and five counters.

From time to time it may be desired to take the totals standing upon one or another or possibly all of the totalizers either with or without resetting. For this purpose certain lock controlled devices are provided through the adjustment of which it is made possible for an authorized person to condition the machine for the printing of totals from any of the totalizers and the returning of the same amounts to the wheels, i. e., sub-totaling, while the same person or another specially delegated party may so condition the machine as to effect the resetting of the totalizers coincidently with the printing of totals. Now since there are a large number of totalizers provided in the illustrative machine for which there are no single selecting keys and which are engaged with the actuators under the joint control of a plurality of keys it has been found necessary or desirable to provide a plurality of total controlling levers each of which may be moved to any one of several totaling positions. These levers are normally locked, but when the manager of the store, for example, releases them by the use of a special removable key they may be moved to any desired position. Now for the three banks of what have been termed the universal totalizers, comprising twenty-seven in all, the selection of any one for totaling may be aided by the depression of the corresponding key in one of the three special banks, just as for item entering operations. The invention, therefore, contemplates the movement of one of the totaling levers to a certain position, which is one step removed from the normal adding position, and in which any one of the twenty-seven universal totalizers may be selected for sub-totaling by depression of the related key. A similar arrangement is made possible with respect to the twenty-seven item counters having the universal transfer construction, but in order to distinguish between the totalizer and the item counter related to a particular key during total taking there is provided a separate position of the same total lever for item counter totals. This position may, for example, be two steps away from normal. However, this arrangement alone does not take care of the three individual transfer type of totalizers located one in each of the three banks discussed above nor the three individual transfer item counters. Separate positions of the same total lever are accordingly provided for determining the selection of each of these individual totalizers during totaling. This control is necessarily without the aid of any special keys since no keys correspond directly to these totalizers. Substantially the same construction is provided for that item counter which represents a grand total of the number of all sales entered, the only difference being that a definite position of the other total lever is provided for this purpose. As for the remaining individual transfer item counters the aid of the cashiers' locks may be relied upon to effect a selection so that the total lever first mentioned is merely placed in the second position specified and the appropriate cashier's lock turned.

For the remaining twelve totalizers, namely the bank of eight individual transfer totalizers and the four adding and subtracting totalizers, there must be provided four additional positions for the first mentioned lever, as well as some eight positions other than the normal and "Total sales counter" positions of the second lever. By the arrangement specified it is thus made possible to select any one of the forty-two totalizers or of the thirty item counters by the selective movement of one of two levers to one of nine positions away from normal, the selection of certain of the totalizers and counters being aided by the depression of certain keys or the turning of the cashiers' locks.

The resetting control is precisely the same for all totalizers and is effected by the mere turning of a lock in addition to the appropriate adjustment of the levers mentioned. Thus, in order to condition the machine for a reset or grand total operation it is necessary that the party operating the machine should have not only the key to unlock the pair of adjustable levers but a special key to turn the resetting control lock.

One feature of the invention which should probably be mentioned at this point is the general mode of operation of the differential mechanism. During normal adding operations this mechanism is entirely positive in its action and is of the type involving complementally movable elements which move in opposite directions until a shoulder on each engages a portion of the depressed key in the particular bank involved. During totaling operations it has been found desirable to introduce a spring for operating that one of the complemental elements for each bank which is connected at the time through gearing to the totalizer actuator. On operations of this kind it is desired to have the totalizer elements, in being turned back to zero positions, to control the extent of movement of the actuators and hence the complemental elements. For this reason, the special springs are rendered effective for totaling to insure the movement of the actuators and connected ones of the complemental members prior to any movement of the remaining complemental members; in this way the latter will then subsequently be shifted, after the totalizer wheels have reached zero, to take up the balance of the full complement which each pair of members must receive. Since the type carriers are therefore positioned under only spring control in totaling, certain precautionary devices have been provided to lock up the machine in the event of any interference with the free movement of the type carriers as by the insertion of a wire.

An important phase of the machine is the provision of suitable machine release and key interlocking devices. The arrangement adopted for purposes of illustration contemplates compelling the operation of a key in each of the special key banks as well as the turning of one of the cashiers' locks into active position as an incident to the operation of the machine. Four separate locking arms are therefore provided to normally block the operation of the main shaft. However, when totals are being taken from any of the twenty-seven totalizers of the universal transfer type, or when totaling from the corresponding item counters, the machine should be releasable by the depression of a single key. Furthermore, it should be impossible at such times to depress more than a single key. To this end the movement of one of the total control levers to the position wherein it predetermines either of the two conditions mentioned it automatically serves to couple up the four locking arms in such a way that movement of one will cause releasing movement of all four. Again, when the machine is conditioned for taking totals from other totalizers or counters which are not directly related to one of the special keys or a cashier's lock the machine should be releasable without the need of depressing any key or the turning of either of the cashiers' locks. To this end movement of either of the total controlling levers to any position, other than the two above specified, away from normal is adapted to automatically withdraw all of the four locking arms mentioned so that the machine may be operated directly or may be released by a motor bus bar.

In addition to the foregoing machine locking and releasing mechanism there are provided interlocking means which prevent movement away from normal of more than one of the total control levers at a time; there are also means for preventing depression of more than a single key in any bank and means for compelling proper coordination between the total levers and special keys for all positions of the levers. Various other locks and interlocks will be described in connection with the detailed description which will follow.

With this brief general outline of the features of the machine as a whole the several sections will now be described in detail with reference to the drawings which accompany and form part of the specification.

In the drawings:

Figure 2 is a vertical sectional view thru the machine showing the differential mechanism, the indicators, a bank of universal totalizers, and the cash drawers.

Figure 4 is a plan view showing particularly the actuators for the totalizers and counters and showing the denominational shafts for driving the same.

Figure 5 is a view in side elevation, partly broken away, of a bank of universal totalizers with a related grand totalizer. For clearness one of the spacing frames has been removed.

Figure 6 is a vertical sectional view taken through a universal totalizer bank along the line 6—6 of Figure 5 and looking in the direction shown by the arrows.

Figure 7 is a view in rear elevation of a bank of universal totalizers.

Figure 8 is a vertical sectional view thru an amount key bank showing the complemental slides. This section is taken along the line 8—8 of Figure 2, looking in the direction of the arrows.

Figure 9 is a vertical sectional view taken toward the rear of an amount key bank along the line 9—9 of Figure 2 and shows the zero stop and complemental slides.

Figure 10 is a plan view of the total controlling levers, with their designating plates, and also showing the reset lever and lock.

Figure 11 is a plan view of the groups of special keys, namely, the transaction, clerk, and department keys.

Figure 13 is a detail view of the rearwardly tensioned centralizing slide for a special key bank.

Figure 14 is a detail view of the forwardly tensioned centralizing slide for a special key bank.

Figure 15 is a detail view of a fixed plate used to guide and strengthen the ends of the special keys.

Figure 16 is a detail view of a positioning slide acted upon by the four rear special keys of a bank.

Figure 17 is a detail view of a positioning slide acted upon by the five front special keys of a bank.

Figure 18 is a plan view of certain of the interlocking mechanism.

Figure 19 is a view in side elevation of a portion of the interlocking mechanism and the cashiers' locks.

Figure 20 is a detail view showing the cam plates operated by the cashiers' locks and is a section taken on the line 20—20 of Figure 19, looking in the direction of the arrows.

Figure 21 is a detail view of the single key mechanism associated with the interlocking mechanism.

Figure 22:
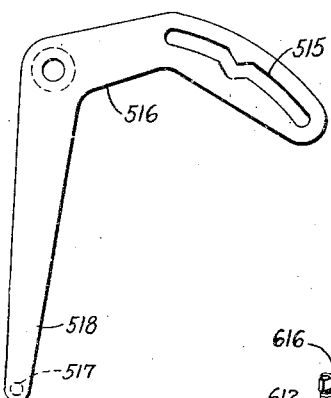
Figure 23:
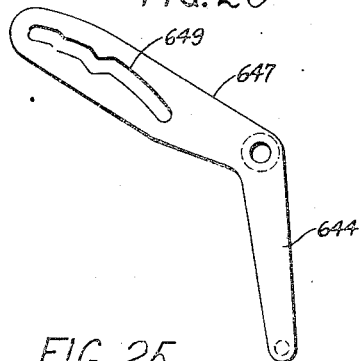
Figure 24:
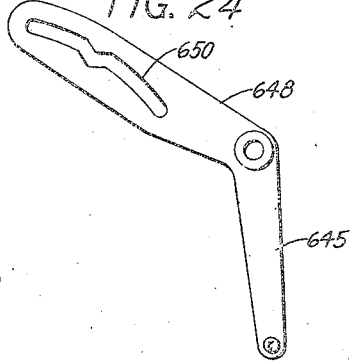

Figures 22, 23, and 24, are detail views of certain of the bell cranks associated with the totaling levers.

Figure 25:
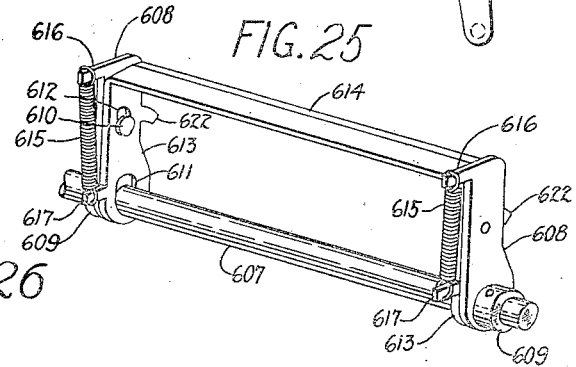

Figure 25 is a perspective view of the interlock bail.

Figure 26:
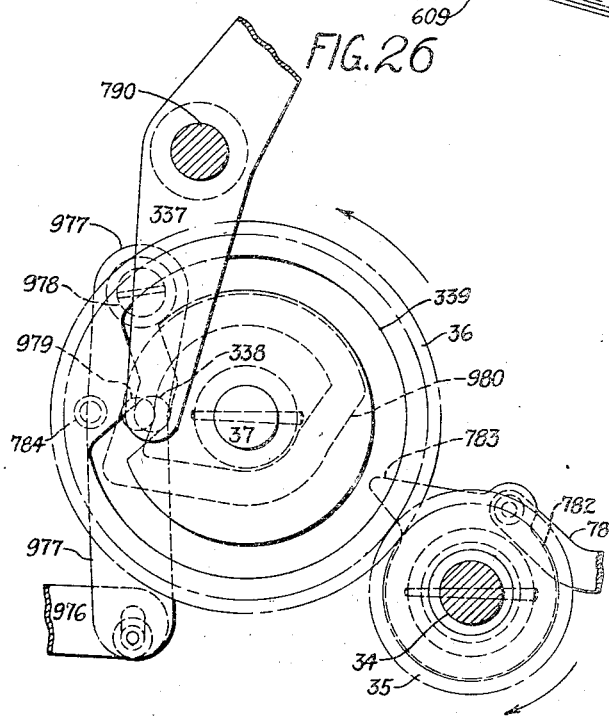

Figure 26 is a view in side elevation showing the spindle on which the operating handle is mounted and the gear connections to the main operating shaft. The cam grooves in the gear which is shown operate the check ejecting mechanism, the actuating means for the totalizer selection mechanism, and the consecutive numbering mechanism.

Figure 27:
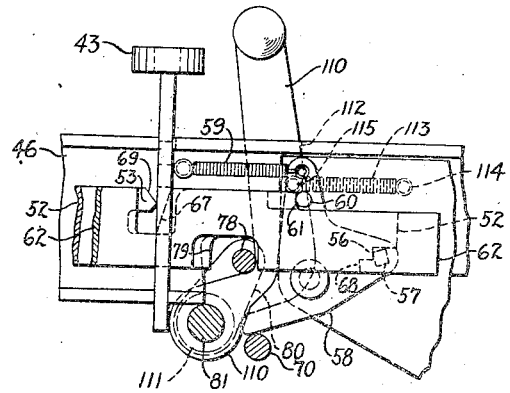

Figure 27 is a detail view in side elevation of a portion of the transaction key bank showing the correction lever in normal position on the other side.

Figure 12:
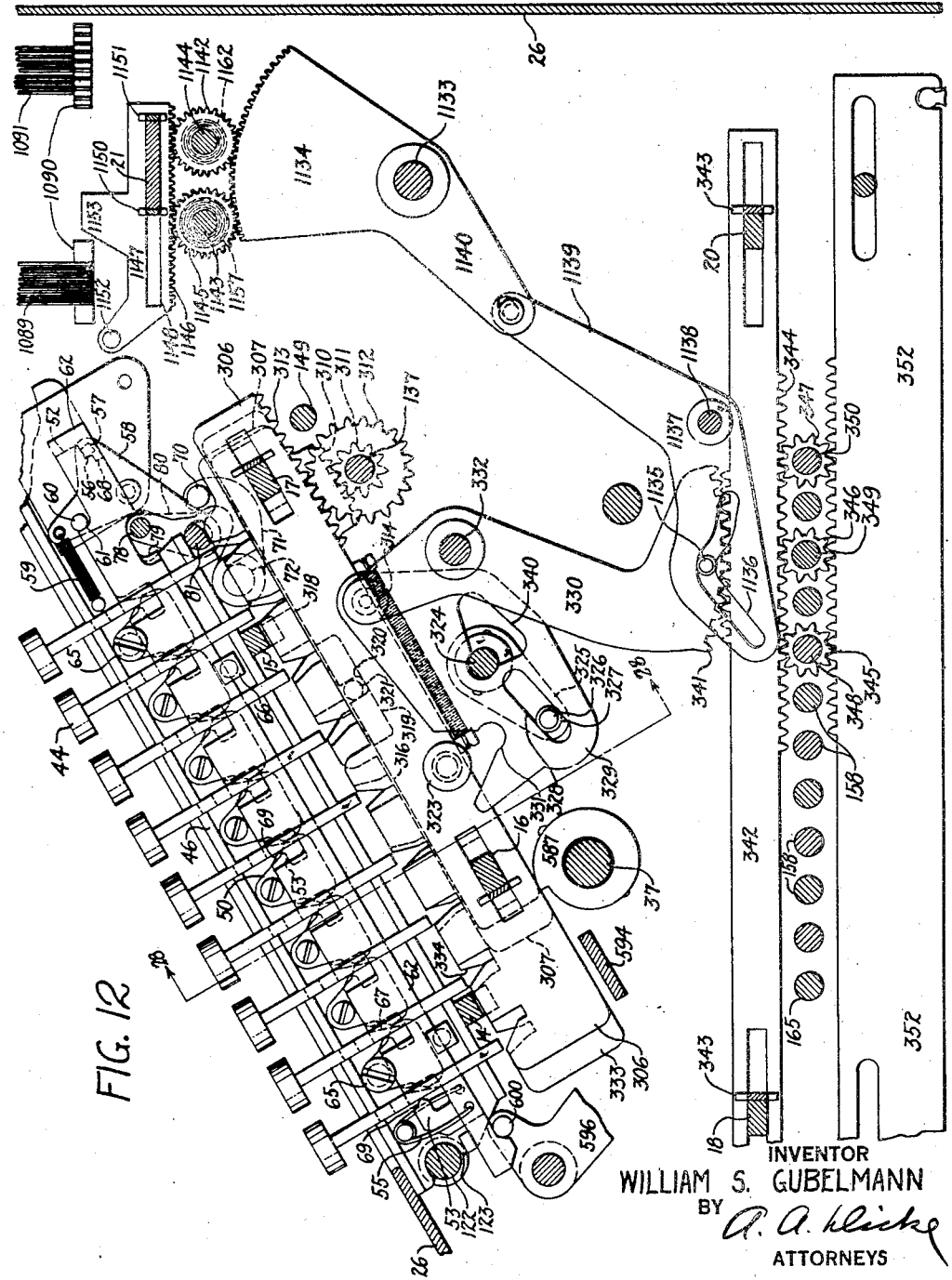
Figure 12 is a vertical sectional view of a special key bank showing also the selection mechanism operated under control of the special keys.
Figure 28:
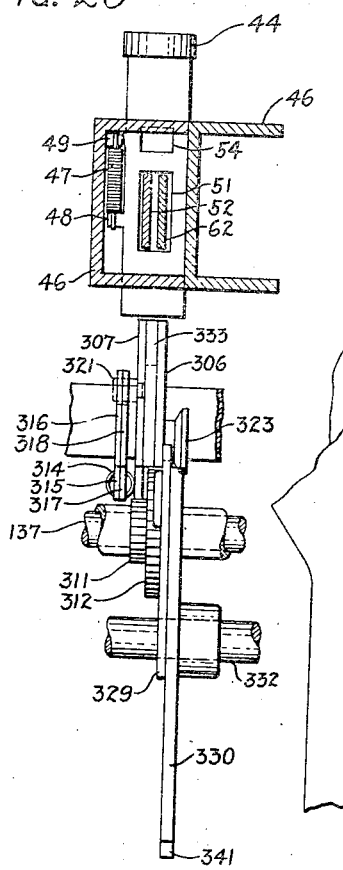

Figure 28 is a vertical section thru one of the special banks of keys showing also the selecting mechanism. This section is taken along the line 28—28 of Figure 12, and looking in the direction shown by the arrows.

Figure 29:
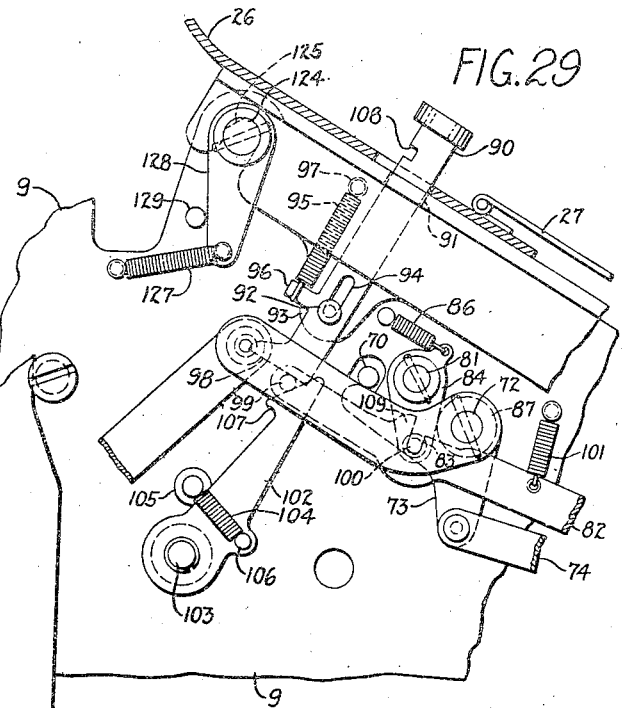

Figure 29 is a view in side elevation of the repeat mechanism.

Figure 30 is a chart showing graphically the timing of the major functions performed by the machine.

In the following description reference is made to numerals appearing on the drawings. Said drawings correspond to certain figures of the drawings of said Patent 2,226,919. The drawings contain certain numerals which are not referred to in the following description because they pertain to parts not deemed of importance in connection with the present invention. For a description of the parts indicated by said numerals reference may be had to said Patent 2,226,919.

*Framework and casing*

As best shown in Fig. 4, the main frame of the machine, which serves to support all of the various mechanisms to be described, comprises a pair of side frames 9 and 10, the first situated toward the left side of the machine and the second toward the right. An intermediate frame 11, which need not be as thick as the side frames, is located toward the center of the machine to break up the otherwise unsupported span of certain through shafts which serve in a measure to aid in holding these vertical frame elements together and in their proper relations. Various means in the form of cross bars 14, 15, 16, 17, 18, 19, 20, 21, 22 and 23, as illustrated in Fig. 2, are primarily relied upon for maintaining the proper positioning and rigidity of the frame structure aided, as before explained, by a number of through shafts. All of the vertical frames are secured to and supported by a base plate 24 which rests on a drawer unit generally designated by the character 25.

The arrangement is such that the bulk of the operating parts are located between the two outside frame members 9 and 10, although at each side there is an overhang of certain portions of the mechanism including a number of the main through shafts. It will be understood as the description progresses that wherever possible the various distinct features of the machine have been constructed as individual units having their own supporting structures which are separably mounted and secured in place on an appropriate portion of the main supporting structure.

A casing 26 is adapted to surround all of the frame work as well as the great majority of operative parts including those which extend beyond the main side frames. Suitable openings are provided in this casing for permitting the indicators to be viewed and permitting the necessary access to various portions of the printing mechanism. The casing, Fig. 1, has a hinged cover 27 for normally concealing the parts related to the total levers, a cover 28 for permitting access to the roll containing the printed detail strip, a cover 29 for permitting removal of the entire detail strip unit and access to the check strip and electros, and for giving access to the printer 30 for the purpose of inking the ribbon. A drawer 31 may be provided below the printer unit and may be used for filing away installment sheets, charge account sheets, or similar slips. Openings are also provided in the casing for the key units and operating handle, as well as for other operative elements which must be accessible from the outside of the machine. A marble slab 32 may be provided on a front shelf of the case for retaining money, sales slips and the like, during the course of operation of the machine.

Operating mechanism

Figure 1:
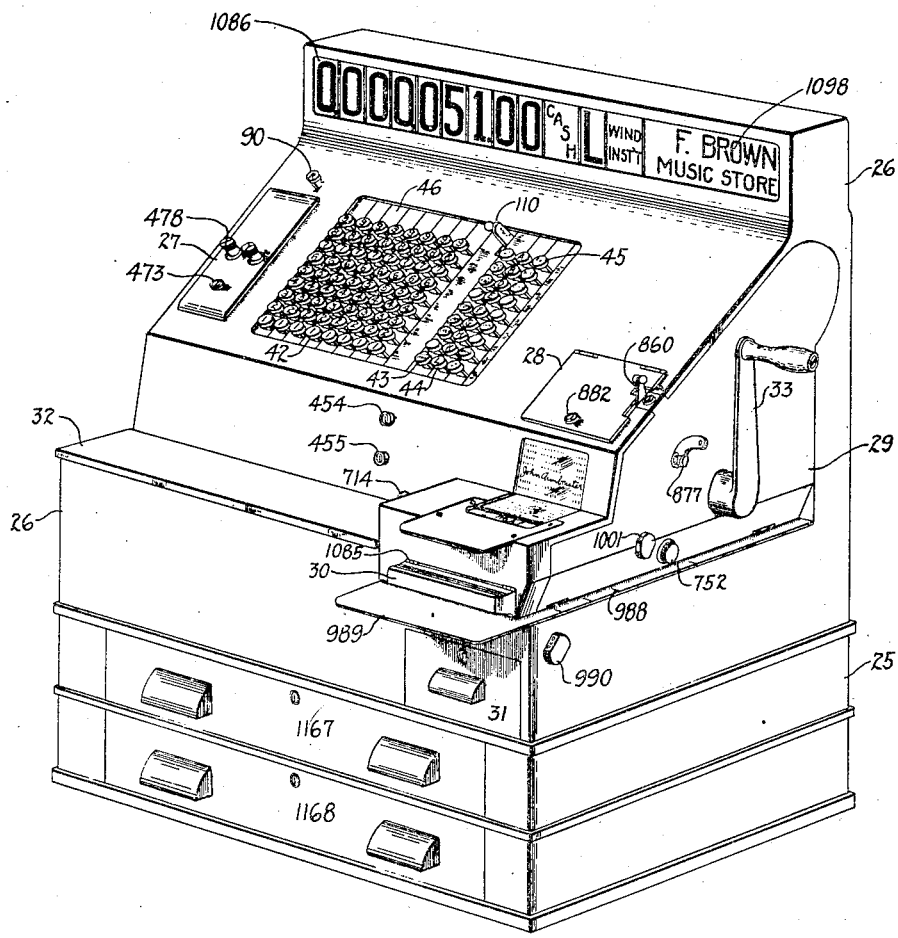
Figure 1 is a perspective view of the entire machine.

The machine illustrated is adapted to be driven by means of a hand crank 33, Fig. 1, although it will be understood that a motor may readily be provided to supply the motive power if desired. In actual use it will no doubt be advisable to employ a motor, since the machine will necessarily require a fair amount of power for its operation. The crank 33 is suitably connected for driving the main shaft 37 which extends across the entire machine and serves to transmit the power to certain operating parts at intermediate points within the machine as well as to certain mechanism at the left hand side of the machine on the outer side of the left side frame. It is on this side of the machine that a gear thereon serves to drive an idler gear 39 which then transmits the power to a gear not shown which is coupled by means of a hub to a camming unit 506 to be described in greater detail hereinafter.

Keyboard

As has already been mentioned, the machine disclosed is provided, as best shown in Fig. 1, with a number of banks of amount keys 42 which are sufficient to set up an amount up to $999,999.99. There are also provided three banks of special keys such as transaction keys 43, clerks' keys 44, and department keys 45.

Since all of the amount key banks are of the same construction and serve to control related differential devices in the same way, it will be necessary to describe only one bank in detail. As best shown in Fig. 2, each bank of keys is constructed and arranged as a separate unit removable as an entity together with certain associated latching and locking devices. For this purpose the main supporting structure for each bank comprises a channel member 46 (Figs. 1, 2, and 8) which is suitably slotted in its upper and lower overturned portions to receive the stems of the nine keys in the bank. Springs 47 (Fig. 8) connected between hooks 48 on the keys and studs 49 extending from the inner side of the web of the channel serve to hold the keys normally elevated. A series of single key pendants 50 pivoted on studs extending from the side wall of the channel member are arranged in the usual manner to have a limited movement which will permit the introduction of only one key stem between an adjacent pair of pendants or the camming of an end pendant which then shifts the others into locking position. It is to be noted in this connection that the keys are assembled in such a way as to present their flat faces toward the front and rear of the machine and they are provided with suitable openings 51 (Fig. 8) through which the pendants are adapted to swing. A latching and locking bar 52 Figs. 8, 9, 12, and 27) is also adapted to pass through these openings in the series of keys and is provided with a series of bills 53 (Fig. 27) which may cooperate either with the upper edge of the opening 51 of the keys or with the lower edge of an upper and smaller opening 54. The bar 52 is spring urged by means of a spring 55 (Fig. 2) toward the upper rear end of the keyboard but this movement is normally opposed by means of the cooperation of a shoulder 56 of the bar with a square lug 57 carried by a pivoted plate 58 which is urged counter-clockwise by a spring 59 (Fig. 27). A pin 60 carried by an upwardly extending arm of the plate is in the path of movement of a shoulder 61 of a releasing slide 62. This slide is parallel with and adjacent to the bar 52 and passes through the openings 51 of the keys, both the bar and the slide being guided on their upper edges by the recesses formed between the shoulders 63 on a pair of studs 64 and the large heads of screws 65 while the bottom edges are guided by a notched stud 66. Cam surfaces 67 (Fig. 27) provided on the slide 62 one adjacent each of the keys are adapted to be engaged by the solid parts between the two openings in the keys as the latter are depressed. Thus, depression of any key in a bank will cause rearward movement of the releasing slide in opposition to the action of the same spring 55 whose opposite end is connected to the bar 52. Rearward movement of the slide will cause its shoulder 61 to engage the pin 60 and rock the plate 58 until the lug 57 is carried away from the shoulder 56 and is brought into the path of another shoulder 68 on the bar 52. Spring 55 may then shift the bar slightly to the rear until one of the bills 53 enters the upper opening in the depressed key while the other bills enter the lower openings 51 in the undepressed keys. This movement of the bar, however, is not sufficient to completely lock the undepressed keys since the latter cooperate merely with the cam faces 69 of the locking bills and if another key is depressed it will force the bar forwardly until the previously depressed key is released and then upon further depression of the new key the bar will be released to partake of the same latching movement which it had for the first key. In this connection it should be mentioned that the single key pendants 50 are so formed that depression of a second key sufficiently to release a fully depressed key will be permitted, but full depression of two keys is not possible. Thus there is provided a flexible keyboard construction in which it is impossible to fully depress more than a single key and simultaneous depression of two keys will be prevented.

In order that all of the keys will become locked in either depressed or undepressed position upon the initial operation of the main operating mechanism of the machine a cross rod 70 (Figs. 12 and 29) extends across the machine beneath a forward extension of the plates 58 related to all of the banks of keys. This rod is carried by and secured to a pair of arms 71 loosely mounted on a shaft 72 which extends between the left side frame and the center plate 11 of the machine. Rod 70 extends beyond the right hand arm 71 to cooperate with the transaction key banks. A plate 73 (Figs. 3 and 29) also loosely mounted on the shaft 72 passes beneath an extension of the rod 70, which protrudes beyond the left side frame, and when the plate 73 is rocked slightly clockwise (Fig. 3) by means which will presently be described the rod will be elevated and will rock all of the plates 58 clockwise to an extent sufficient to disengage lugs 57 from shoulders 56 or 68 and permit full movement of the locking bars toward the rear. It will be clear that this movement of a bar 52 will serve to carry the bills 53 into full locking relation with respect to all of the keys of its bank.

Figure 3:
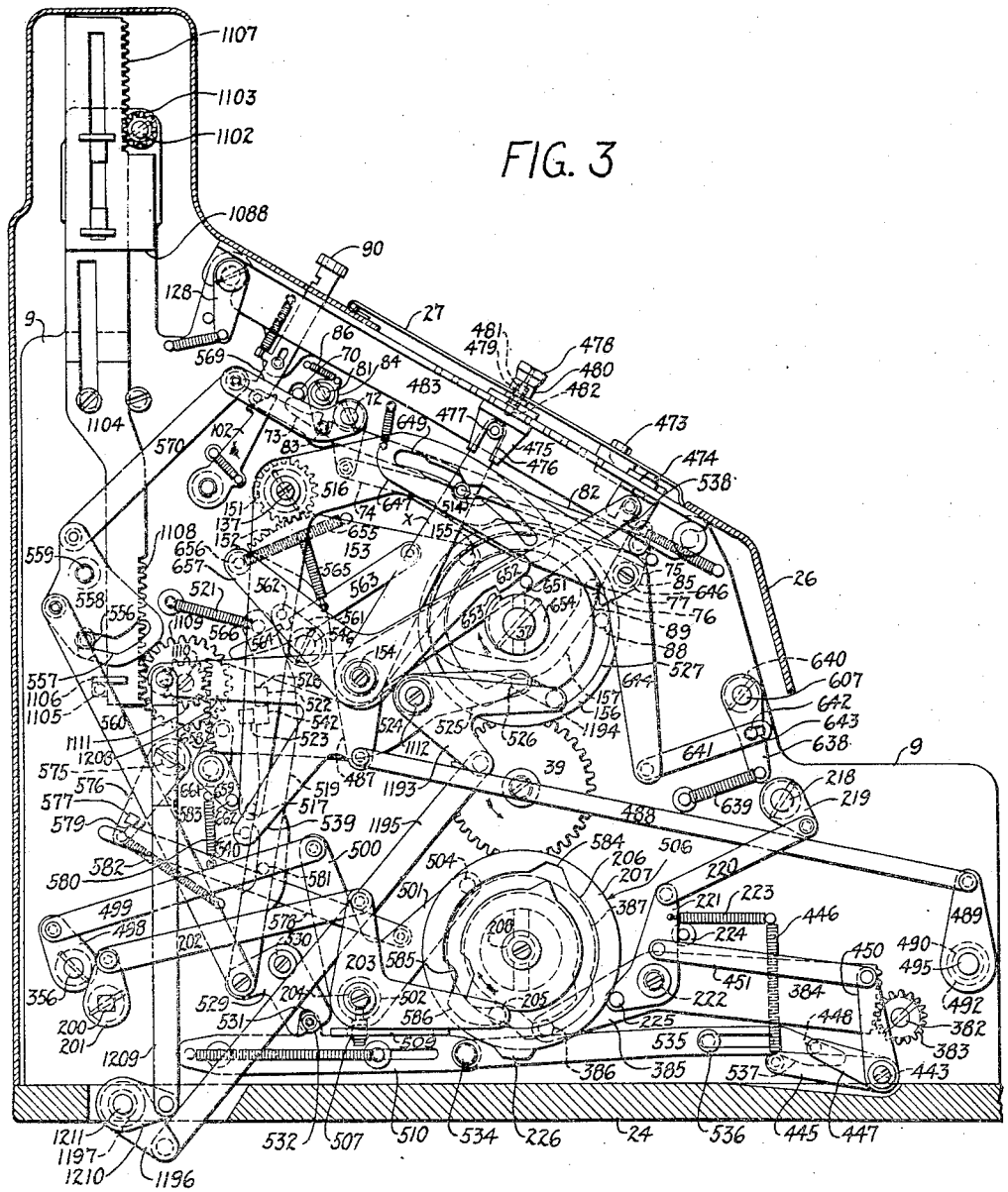
Figure 3 is a side elevation of the machine showing the control mechanism mounted on the left side frame of the machine.

The means for rocking the plate 73, as mentioned, is best shown in Fig. 3 and comprises a link 74 connected at its rear end to the plate and at its forward end to an arm of a pawl 75. A spring attached to the upper end of the pawl arm tends to urge it clockwise until arrested by the pin shown. Another arm 76 of this pawl is in the path of a stud 77 carried by a member (not shown) secured to the driving shaft 37. The arrangement is such that very early in the operation of the machine the pawl will be rocked and will impart a clockwise movement to all of the plates 58 (Fig. 12) thereby releasing all of the locking bars 52 for their full locking movement, as explained.

Toward the end of an operation of the machine the bars 52 are all shifted in the reverse direction against the action of the springs 55 to release the keys so that those depressed may be restored to normal by means of their springs 47. For producing this movement of the bars there is provided a rod 78 (Figs. 12 and 27) which extends across all of the banks of keys and is adapted to cooperate with a shoulder 79 on each of the bars. This rod is carried by suitable arms 80 secured to a shaft 81 which is rocked counter-clockwise, as viewed in Figs. 12 and 27, near the end of an operation of the machine by means comprising a link 82 (Figs. 3 and 29) which is connected by a notch 83 therein at one end to an arm 84 secured to the shaft 81 and connected at its other end to an arm of a pawl 85 somewhat similar to pawl 75. The shaft 81 is held in normal position by spring 86 forcing arm 84 against the hub 87 of plate 73 (Fig. 29). A pin 88 carried by a member (not shown) secured to the shaft 37 serves to engage another arm 89 of the pawl 85 and rocks it counter-clockwise (Fig. 3) to release the depressed keys through the connections just described. When the bars 52 are thus restored slightly beyond their normal positions the plates 58 will be permitted to rock under influence of their springs 59 until the square lugs 57 are again in their normal relation in the path of shoulders 56.

A mechanism is provided, which, by disabling the above described key releasing action, allows all of the keys set for a previous item to remain depressed and ready for a repeat operation. This mechanism includes a repeat key 90 (Fig. 29) located in the upper left hand portion of the machine (Fig. 1) and mounted on an angular frame that will subsequently be described in connection with the total levers. The key is slidably mounted within a slot 91 in the horizontal portion of the frame and is slotted at 94 to surround a stud 92 in an ear 93 of the vertical portion of the frame. The slot 94 limits the movement of the key which is held up normally by a spring 95 connected between an extension 96 of the key and a stud 97 on the frame. An extension or foot 98 of the key coacts with a pin 99 mounted in the rear end of the link 82 which is normally held up to engage its notch 83 with the stud 100 on the arm 84, by means of a spring 101. The pin 99 on link 82 is of sufficient length to be in the plane of a latch 102, which is out of the plane of both link 82 and key 90. This latch 102 is fulcrumed on a stud 103 in the side frame and is held against pin 99 by a spring 104 connected between a stop stud 105 on the side frame and a stud 106 on the latch. On depression of the key 90 the pin 99 will be forced under and will be held by the nose 107 of the latch 102, this motion being sufficient to bring notch 83 out of engagement with stud 100. The link 82 will not, on its subsequent movement to the left (Fig. 29) rock shaft 81 to release the keys, but will pass under stud 100 on arm 84. After a slight clearance is taken up between stud 105 and latch 102, the pin 99, because of the movement of the link, will disengage itself from the latch. The link will then be drawn upwardly slightly by spring 101 and will be held against the stud 100 until the return movement of the link to the right will again engage the notch 83 with the stud. The repeat key is allowed to rise after latching the pin 99 under the nose 107 if only a single repetition of an item is desired, however, if more than one repetition is desired, the key may be held down by latching the notch 108 in the key into the edge of the casing 26 at the upper end of the slot 91. This will serve to hold the pin 99 down for re-engagement by the hook 102 as the link is restored toward the front of the machine. The link 82 is provided with an extension 109 in rear of the slot 83, this extension being added to enable the correction lever, which will be described, to release the pin 99 from the hook 102 and thus disable the repeat mechanism. If the link is merely held by latch 102 and is not locked down by the repeat key, a clockwise correction movement of the shaft 81, by means to be presently explained, will rock the stud 100 against the extension 109, thereby releasing the pin 99 from the latch 102 and permitting the spring 101 to restore the link to normal.

A correction lever 110 (Fig. 27) is provided, and is mounted beside the transaction bank of special keys (Fig. 1). This lever is loosely mounted by hub 111 on shaft 81 and protrudes thru a slot 112 in the blank spacing channel between the amount and the special keys. The lever is spring held against the end of slot 112 by a spring 113 connected between stud 114 on the vertical wall of the transaction key supporting channel and a stud 115 on the lever. The lower contour of the lever is such as to clear the rod 70, which acts on the plates 58, and to contact with the under and rear sides of the rod 78 so that a counter-clockwise rocking of the lever (Fig. 27) will rock the shaft 81, through the rod 78 and arms 80, against the pull of spring 86. The rod 78 will then reset any of the slides 52 which were moved to the right (Fig. 27) thus withdrawing the bills 53 and allowing the depressed keys to rise. At the same time the pin 100 will be shifted to release the repeat mechanism as explained.

A two armed member 116 which is normally urged in a counter-clockwise direction (Fig. 2)

by means of a spring 117 carries a stud 118 which is in the path of the rear upper end of the releasing slide 62 (Fig. 9). At the forward end of a downwardly extending arm 119 of this member there is formed a tab or lug 120 which, as will be more fully described hereinafter, serves as a zero stop for a certain differential member. The member 116 and plate 56 are both pivoted in a plate riveted to or forming an extension 121 of the web of the channel 46.

The key-board channel member 46 which supports all of the elements which have been described in this section except the shafts 72 and 81 and related connections is supported at its lower end by means of a rod 122 (Figs. 2 and 12) which is engaged by a notch 123 in the vertical web of the channel. At its upper end the channel 46 is supported by means of a rod 124 which has a flat face 125 formed thereon so that a hook 126 formed at the upper end of the channel may be carried freely into engagement with the rod 124 as the channel pivots about the lower rod 122. After all of the desired key channels have been properly positioned the rod 124 may be turned slightly about its own axis to carry the flat side away from the assembling position and into a position preventing withdrawal of the hooks 126. If desired the rod may be urged into its locking position to hold the channels in place by means of a spring 127 (Fig. 29) connected to an arm 128 secured to the rod. Movement of the arm may be limited by a pin 129 on the side frame 9. As a further support for the key units they may rest upon the pair of rectangular suporting bars 14, and 15, previously mentioned, which are secured at their opposite ends to the side frames. These bars serve to prevent tilting of the channels on the rods 122 and 124.

Differential mechanism

The differential mechanism which is controlled by the amount keys is shown in said patent as being of the type employing members which are complementally movable in opposite directions and which thereby are permitted to be positively driven in both directions. For the purposes of the present invention its particular construction is not material. It is thought sufficient to state merely that any means is provided which will cause a device such as a rack slide 130 (Fig. 2) to move differentially under the control of a depressed key and that the said movement is imparted to actuator slides as 169.

Normally the member 130 is prevented from movement by the downwardly extending arm of the previously mentioned member 116 (Fig. 2) whose lug 120 cooperates with the uppermost projection 134. When some key in the bank is depressed, however, this pivoted member is rocked, as explained, and its lug is withdrawn from the projection at the upper end of member 130. Upon subsequent operation of the machine, the member 130 is shifted up and to the rear until stopped by engagement of one of its projections with the depressed key or by engagement of the lower ends of the slots 132 with the supports 16 and 17. The extent of movement of the member will be directly proportional to the value of the key depressed. Member 131 on the other hand is normally free to move downwardly upon operations of the machine and if no key in the bank has been depressed this member will move an extent equal to nine steps. At all times it will move an extent which is the nine's complement of the distance through which the member 130 is moved upwardly. This means that when the upper or nine key is depressed member 131 will be locked against any downward movement.

Control of actuators

As has already been briefly explained, the present machine is provided with a large number of totalizers and these are arranged in banks each extending from front to rear of the machine and the several banks being horizontally arranged across a considerable portion of the width of the machine. This means that a set of actuators must be provided for each bank of totalizers and each set must contain an actuator corresponding to each denominational order of the key-board. Due to the necessity of using these actuators in connection with the taking of totals, as will be explained more fully hereinafter, one set must be provided for each bank of item counters as well. In the illustrative machine this calls for eight actuators corresponding to each denomination of the keyboard, each actuator being capable of operating a particular order of any of the totalizers or counters in a particular bank. As a convenient means of coordinating the eight actuators which must partake of the same movement under the control of one of the banks of keys a shaft 158 (Fig. 4) is provided for each denominational order.

There are, therefore, as many of these shafts extending across the machine between the pair of side frames as there are banks of amount keys on the keyboard and as shown there is one additional similar shaft 165, making nine in all, for the purpose of taking totals from an extra or overflow order provided in each totalizer as will be explained.

The connections for driving the shafts 158 to differential extents comprise pinions 159 secured one to each shaft and each meshing with a rack 160 (Fig. 2) supported by suitable cross bars 18, 19, and 20, each in turn meshing with a gear 161 loosely mounted on the shaft 37. These gears 161 are of extra width and are adapted to transmit the movement of the members 130 to the racks 160. For the purpose of driving the actuators 162 of which, as stated, there are eight for each denominational order, each shaft 158 is provided with seven pinions 163 secured thereto. The eighth actuator is driven directly by the pinion 159 which, as before mentioned, serves to transmit the movement of the rack 160 to the shaft. This is the reason for spacing the gears 161 by means of the collars 164 as shown in Fig. 4, and for forming them of extra width so that each may not only mesh with a member 130 but may mesh also with its related rack 160 which at the same time may be located directly above an actuator 162 of the particular denomination involved.

It is to be noted that the shafts 158 are not placed in a regular denominational order. The reason for this is that if they were placed in a regular order with the units shaft next to the tens, etc., there would not be room enough between a pinion 163 on one shaft and a pinion 163 on an adjacent shaft for the provision of a substantial hub, such as the hubs that are shown, which are used for securing the pinions 163 to the shafts 158. Therefore, the denominational shafts are interspersed or specially arranged as shown to secure room for an adequate method of fastening the pinions 163 to the shafts 158.

For printing and indicating totals from the extra or overflow order of the totalizers and counters, eight actuators are also provided. One of these actuators has an extra shoulder 166 (Figs. 2 and 4) which is adapted to cooperate with an element that is stationary on item operations and thus confines the entire inter-connected group of actuators in normal position when not taking totals, as will later be explained. The actuators for this denominational order mesh with related pinions 159 and 163 secured to the shaft 165, the pinion 159 meshing with the corresponding rack 160.

Totalizers

As has been stated hereinbefore the illustrative machine is equipped with forty-two totalizers of various constructions. A detailed description of the totalizers is not necessary for the purposes of this application as those of Patent 2,226,919 or those of the prior art will operate equally well as far as the interlocking mechanism of the present application is concerned.

Special key banks

In addition to the banks of amount keys the machine, as already suggested, is provided with several banks of special keys, there being three such banks shown (Fig. 11). These are devoted to the designation of clerks, transactions and departments and are indicated respectively by the characters 44, 43, and 45.

The construction and arrangement of these keys in each bank are substantially the same as for the amount keys. Thus, there is provided for each bank a detent bar 52 (Figs. 12 and 27) carrying hooks or beaks 53 to engage openings in the several keys to hold them depressed or elevated and there is also a release bar 62 which upon depression of a key serves to release the detent bar 52 for one step of movement to latch the key. Single key pendants 50 adapted to permit the full depression of only a single key in a bank are also provided. The parts, furthermore, are mounted in a channel frame 46 which serves to establish a unit assembly of these parts. Upon operation of the main operating mechanism the plate 58 will be rocked an additional step by means of the rod 70 carried by arms 71 secured to the shaft 72 to permit the detent bar 52 to move still further toward the rear so that the beaks 53 may completely lock the keys in whatever position they may happen to be. Toward the end of an operation of the machine the cross rod 78 engages a shoulder 79 on the detent bar and restores it to normal thereby releasing the keys.

The differential mechanism controlled by the special banks of keys is required to take effect much sooner than the amount differentials due to the control of the special keys over the totalizer selecting mechanism as will be explained in a later section. On account of the form of differential mechanism adopted the special keys are not provided with the projections and cut out portions to be found at the ends of the amount keys but are preferably flat across the bottom ends. Another feature of distinction between these banks and the amount banks is that no zero stops are provided for the special keys. This is due to the fact that certain springs are provided to maintain the parts in normal position and the depression of some key in each of these banks is always required to release the machine, except in totaling operations, as will be explained.

Each of the special key banks (Fig. 12) is provided with a pair of slides 306 (Fig. 17) and 307 (Fig. 16) having a series of slots 308 and 309, respectively. The five lowermost keys (Fig. 12) are adapted to cooperate directly with the slots 308 in the slide 306 and these slots have one edge of graded inclination and one edge straight. The construction is such that the lowermost key will shift the slide three steps downwardly while the next key will shift it two steps downwardly and the third key from the bottom will shift the slide only one step downwardly. On the other hand the fourth and fifth keys will move the slide upwardly one and two steps respectively.

The four uppermost keys in the bank cooperate with the slots 309 in the slide 307, and these slots are so arranged that the slide is moved upwardly two steps by the uppermost key, and one and one-half steps by the next key, while the third key from the top shifts the slide downwardly two steps and the fourth key moves it two and one-half steps in this direction. A rack portion 310 on the slide 307 meshes with a pinion 311 mounted loosely on a reduced portion of the shaft 137. Secured to this pinion is a larger gear 312 of twice the diameter of the pinion and this gear meshes with rack teeth 313 formed on the slide 306. It will be understood therefore that any movement of the slide 307 will be transmitted to the slide 306 and in such a way as to cause twice as great a movement of the latter slide. Considering the movements of the slides, as already mentioned, it will be apparent that the slide 306 may be shifted to any one of five different extents downwardly or any one of four different extents upwardly depending upon the key depressed, the greater movements in either direction being brought about indirectly through the slide 307 and the gear and pinion connection. A spring 314 extending between a lug 315 depending from a slide 316 (Fig. 13) and a lug 317 depending from a slide 318 (Fig. 14) serves to maintain these parts normally in the position shown in Fig. 12. For this purpose the two centralizing slides are provided with cut-out portions 319 forming shoulders 320 which engage opposite sides of a pin 321 on the slide 307. The supporting slots 322 cooperating with the bars 16, 17 serve to limit the movement of the slides under influence of the spring 314. Due to the two to one relation between the movement of the two slides any movement of the slides from normal will tend to stretch the spring 314 and this will be opposed by the spring itself.

A stud 323 is mounted on the slide 306 and is carried thereby to any one of nine different positions, five down and four up from the normal. This positioning of the stud takes place at once upon the depression of one of the special keys and prior to any movement of the main operating mechanism. Now as the operating mechanism begins to operate the shaft 324 will be rocked by connections which will presently be described. Arms 325 secured to this shaft carry a rod 326 and rollers 327 which cooperate with a slot 328 in a plate 329 pivoted to the upper end of a bell-crank member 330. A V notch 331 in the plate is adapted to cooperate with the stud 323 as the plate is rocked and since the stud is held firmly in one of its nine positions of adjustment the V camming notch will force the plate together with its own pivot either to the right or left an amount corresponding to the key depressed. This means that the bell-crank member 330 will be rocked about the fixed pivot 332 to an extent depending upon the key which has been depressed.

A special plate 333 (Fig. 15) having a series of slots 334 which are in direct alinement with the several keys of a bank serves to guide the lower ends of the keys as they are depressed and holds them steady. These slots are wide at their upper ends but taper down to the width of the keys at their lower ends. The slots in the slides 306 and 307 likewise converge toward the bottom into a narrower straight sided alining portion and a similar construction is provided for the V notch 331.

The means for operating the rock shaft 324 to rock the plates 329 at the beginning of an operation of the machine comprises an arm 335 secured to the shaft toward its right hand end and a link 336 (see Fig. 51 of said Patent 2,226,919) extending between the arm and a lever 337, carrying a roller 338 (Fig. 26) adapted to cooperate with a cam groove 339 formed in the side of gear 36 on the previously mentioned operating shaft 37. The groove 339 is so formed that after a slight idle movement of the operating shaft the lever 337 will be rocked and will be held in operated position until near the end of the operation of the machine. As will be noted in Fig. 12 the plates 329 are provided with openings 340 surrounding the shaft 324 and so shaped as to insure proper return of the plates to normal upon restoration of the shaft.

Teeth 341 formed on an extension at the lower end of the bell-crank member 339 (Fig. 12) mesh with a rack slide 342 which is mounted on the cross-bars 19 and 20 that support the amount racks 160. Comb plates 343 serve to maintain the proper position and alinement of these racks. Rack teeth 344 on the undersides of the rack slides 342 are adapted to mesh with a pinion 345, 346 or 347, secured respectively to shafts 348, 349 and 350, similar to the amount denominational shafts 159. It will be understood, therefore, that a shaft is provided for each bank of special keys so that, as will now be explained, it is possible to control lower rack slides 351, 352 and 353 in as many of the banks of totalizers as desired, to determine which, if any, of the totalizers in each group shall be active. For this purpose each of the three shafts related respectively to the transaction, clerks, and department key banks, carries a number of pinions 345, 346 or 347 (Fig. 4) which mesh with rack teeth on the upper edges of the lower slide bars, a slide bar of this character being provided for each group of totalizers as to which the particular bank of keys exerts a control. Thus for the transaction bank of keys there is provided a bar 352 for each of the five banks of totalizers and the three banks of counters, since the nature of the transaction being entered determines whether or not certain totalizers or counters are to be engaged with the actuators from each of the groups. There will, therefore, be eight pinions 346 on the shaft 349 related to transactions. The particular clerk involved in an entry in the machine on the other hand, need only affect the selection of a totalizer or counter in the clerks' bank so that but two bars 353 and three pinions 347 on the clerks' shaft 350 are provided, the one pinion being merely for actuation of the shaft from the corresponding slide 342. As for the department keys it will be observed that they enter into the selection of a totalizer not only in the department bank but also in the bank of eight individual carry totalizers to determine the selection of the two uppermost totalizers, namely the groups one and two total sales registers; they also select a department counter. There will, therefore, be three bars 351 and three pinions 345 related to the department key shaft 348. There are extra pinions on the three shafts for positioning the type bars, as will be explained later.

It is not deemed necessary for the purposes of this application to describe the means whereby the selection and engagement of totalizers is determined. The means of said application S. N. 334,160 (Patent 2,226,919) or other known or suitable means may be employed.

*Cashiers' locks*

As best shown in Figs. 1, 19, and 20 there are provided two cashiers' locks 454 and 455 which are adapted to designate which of two cashiers is on duty. Turning of a selected one of the locks will control a number of functions in the machine, such as the selection of certain totalizers, and release of machine locking devices. Only the control over totalizer selection will be discussed here, while the remaining features will be dealt with under later sections devoted to the particular features.

At the inner end of the barrel of each lock there is provided a cam plate 456 each of which has a toe adapted to engage the locks. Each cam plate furthermore has a bent over portion 459 which is normally adapted to engage a central overturned extension 460 of a slide plate 461. In the normal position of these cam plates, as shown in Fig. 20, they serve to hold the slide plate against movement by cooperation of the latter with the portions 459 of the cam plates and these, in turn, are held against further counterclockwise movement by the pins 457. Upon turning one of the locks in a clockwise direction (Fig. 20) by means of an inserted key, the bent portion 459 of the cam plate will engage a camming surface 462 of a corresponding overturned extension of the slide plate 461. Continued turning of the lock will therefore shift the slide plate, it being noted that the bent portion of the cam plate that is turned has, in the meantime, moved out of the way to permit this movement of the slide. As will be apparent, the upper lock will cause an upward movement of the slide while the lower lock will cause a downward movement. Rack teeth 463 are provided at the lower end of the slide and these mesh with a pinion 464 secured to a shaft 465 (Figs. 4 and 19). This pinion also meshes with teeth 466 on a slide 467 which as will be later explained aids in the selection and release of the cash drawers.

Other pinions 470 (Fig. 4) secured to the shaft 465 are located in the planes of slides 471 similar to slide 467 and which through two armed members 355 serve to shift totalizer or counter selecting slides 472. One of these selecting slides is provided for the adding and subtracting group of totalizers, the individual carry group, the transaction and department groups of universal totalizers as well as the corresponding groups of counters.

*Totaling controls*

In the preceding sections the operation of the totalizers and counters has been considered only from the standpoint of item entering which, as explained, may involve either adding or subtracting upon certain selected ones. Provision is also made for the taking of totals from any one of the totalizers or counters in such a way that the amount standing thereon may be ascertained by means of both indicating and recording mechanisms and furthermore the operation may or may not involve resetting as desired.

For the purpose of determining the condition of the machine as between item entering and total taking a pair of levers X and Y (Figs. 3 and 10) are provided and these are normally locked in their item entering or adding positions by passing thru openings in the cover 27 which is provided with a lock 473 so that only authorized persons carrying the necessary key may ascertain totals. Movement of one of the levers X or Y will only condition the machine for what is commonly known as a sub-total or read total and will not bring about resetting of the selected totalizer or counter. Whenever it is desired to reset the totalizer or counter selected for totaling it is necessary also to turn the reset lock 474 (Fig. 10) prior to an operation of the main operating mechanism. In order to restrict resetting operations to special parties such as auditors or the like the lock 474 is preferably designed to receive a key different from that required to unlock the levers X and Y. Thus while a manager or perhaps a cashier may be permitted to take sub-totals the operation of resetting is under the control of only the proprietor or a trusted auditor.

The necessity for a large number of totaling positions and hence the desirability of employing a plurality of levers will be apparent when it is considered that there are a large number of totalizers as to which there is no direct means of selection. For example, the selection of any one of the adding and subtracting totalizers depends upon several controlling factors, each of which tends to control the selection of other totalizers as well so that the mere conditioning of the machine for totals is not enough when these totalizers are to be selected.

Each of the levers X and Y is adapted to be shifted to any of its adjusted positions by means of a slidable head 475 having a notch 476 in a downwardly extending portion in engagement with a pin 477 at the upper end of its respective lever. A button 478 (Fig. 3) having a stem 479 slidable in a portion of the hub 480 carried by the head 475 is normally urged downwardly by a spring 431 acting between a collar on the stem and the upper end of hub 480. In the normal condition of the parts the lower end of the stem 479 is centered in a hole 482 in a guide plate 483 in which the head is slidable. Opposite this hole is the legend "Add" which is directly in line with an index point 484 formed on the head. When it is desired to take a total the button 478 related to one of the levers X or Y is raised against the force of the spring and is shifted either toward the front or toward the rear until the index point 484 (Fig. 10) is opposite the desired one of a series of legends related to the type of total desired. The button is then released and the lower end of the stem 479 will enter another one of the series of centering or aligning holes 485 in the guide plate.

Considering first the movements of the lever X which is near the left hand edge of the machine it will be noted in (Fig. 10) that one step of movement of the pointer 484 toward the rear will carry it into the position designated "Read." In this position the machine, as will be explained directly, will be conditioned for the taking of a read or subtotal from one of the universal totalizers located in one of the three groups of such totalizers. Which one of these totalizers will be selected will be further determined by the depression of a desired one of the special keys. In each of the universal groups of totalizers the selecting bars 359, 472, 486 and 496 (Figs. 6 and 7) are so constructed that normally a notch is presented by each adjacent to all of the totalizers, except that in each case the slide controlled by the bank of keys directly related to each group of totalizers will normally present a high portion to all of the fingers 363 to prevent engagement of all. Thus for the clerks group of totalizers the slide controlled by the clerk's keys will normally prevent rocking of all of the bails 364, but for each shifted position of this slide as controlled by a depressed clerk's key, a certain one of the totalizers will be selected to the exclusion of the others.

Connections through which the lever X shifts the several totalizers selecting slides 486 may be of the form shown and described in said application S. N. 334,160 (Patent 2,226,919) or any other suitable form.

If the lever X (Fig. 10) is shifted two steps toward the rear so that the pointer on the slidable head is brought opposite the legend "Read counters" the machine is conditioned for the taking of a total from any one of the item counters with the exception of the total sales counters. To select any one of the twenty-seven universal type of counters the corresponding special key must also be depressed. It will be apparent that in order to avoid confusion with the universal totalizers the slides 486 when shifted the extra step must present high portions to the fingers 363 (Fig. 5) related to all of the universal totalizers. At the same time notches in the slides 486 related to all of the counters with the exception noted will be brought in line with the corresponding fingers. Selection of the two cashier's counters will be permitted in so far as the slides 486 are concerned and which is to be selected will be determined by the pair of cashier's locks. As for the remaining groups of special totalizers and the total sales counter the related slides 486 are so constructed as to produce the same effect when given two steps of movement as for the single step, i. e. high portions will still be presented to the fingers of the related bails 363.

Movement of the lever X three of four steps to the rear so that the pointer on the head 475 is opposite either the "Cashier 1 total sales" or "Cashier 2 total sales" legend will serve to select the corresponding one of these totalizers for totalling. This means that the selecting slides 486 in the transaction or department groups of totalizers will have notches to be brought opposite the fingers 363 of the individual or grand totalizers when the total lever is shifted to these positions, but for all other totalizers of these groups as well as all remaining groups, including also the counters, high portions of the slides will serve to prevent selection.

Similarly upon any movement of the lever X toward the front from its normal adding position only a single one of the entire number of totalizers and no counters will be conditioned for selection. To this end a high portion of the several slides 486 controlled by this total lever will be presented to the fingers 363 of every totalizer and counter with the exception of the one which corresponds to the legend opposite which the pointer 484 stands. Thus upon movement of the lever one step forward a notch will be brought into cooperative relation with the rearmost totalizer of the adding and subtracting group, which is related to total net cash. All other totalizers, and counters as well, will have projections or high portions aligned therewith to prevent their engagement. Movement of the lever two, three, four or five steps toward the front will result in aligning a notch in the appropriate slide 486 with the "Cashier 1 net cash," "Cashier 2 net cash," "C. O. D., C. O. D. paid, Gds. ret. C. O. D.," or "Clerks total sales" respectively, while all remaining totalizers and counters are disabled. All of the first three totalizers mentioned are to be found in the adding and subtracting group while the last mentioned totalizer is the grand total totalizer at the front of the clerks group.

The other total lever Y functions in substantially the same way to select a definite one of the totalizers for a totaling operation.

Timing of totalizer engagement

Suitable means, such as those shown in application S. N. 334,160 (Patent 2,226,919), are employed for properly timing the engagement of totalizers with the actuators for either adding, subtracting or total taking.

Locks and interlocks

The present application has to do particularly with the means disclosed in application S. N. 334,160 (Patent 2,226,919) preventing the operation of the main operating shaft, whether manually or motor-driven, during item entering operations until a key in each of the three special key banks has been operated and until one of a plurality of cashiers locks has been turned to effective position. In the drawings only a manual drive has been shown but if a motor were provided it might be automatically released upon the operation of the four elements indicated or, if desired, a special motor release key might be provided and rendered operable only after the four conditions specified had been fulfilled. During totaling operations where a total is to be taken from one of the totalizers or counters related to one of the special keys the operating mechanism is releasable directly upon depression of any one of the special keys or turning of one of the cashiers locks and the need for depressing two additional keys and turning a cashiers lock or depressing three keys is not only dispensed with but such operation is prevented. When either of the total levers is shifted to a total position for a definite totalizer not related to a particular special key the machine is directly released for operation and no key need be depressed and no cashiers lock need be turned. In fact, all of these elements will be locked against operation at such times.

The conditions so far as the interlocks between the keys and cashiers locks are concerned are no different for resetting total operations than for sub-total operations. However, a special interlock is provided to prevent an operation of the machine after the resetting control lock has been turned and until one of the total levers has been shifted to a totaling position. This is to prevent an operation of the machine for resetting a totalizer or counter, unless the machine is fully conditioned for a totaling operation by movement of one of the levers X or Y, otherwise a misoperation would result. Furthermore an interlock is provided between the two total levers so that only one can be shifted out of the item entering position at a time in order to avoid a conflict in the operation of the selecting mechanism.

Referring particularly to Figs. 18, 19, 20 and 21 it will be seen that the main drive shaft 37 is provided with a series of four disks 587 each secured thereto and each having a shoulder 588 abutting against the end of a related pawl 589. These pawls are pivotally mounted on a shaft 590 and are suitably spaced thereon by means of hubs 591. A spring 592 connected to each of the pawls normally tends to hold it in the effective position shown in Fig. 19. In order to relieve the pawls of the longitudinal force which might be exerted upon them from the driving shaft when an effort is made to turn the latter in the direction indicated by the arrow a shoulder 593 is provided on each and is adapted to cooperate with a plate 594 so that the compressional force suggested will be taken up by this plate and will not be transmitted throughout the length of the pawls to their supporting shaft. Adjacent each of the pawls there is pivotally mounted on a shaft 595, above the shaft 590, a corresponding cooperating pawl 596. Each of the latter carries a pin 597 extending into the plane of the related pawl 589 and adapted to cooperate with an extension 598 of the latter. Three of the pawls 596 are provided with upwardly extending ears 599 carrying pins 600 each adapted to cooperate with a cam formation 601 on the under side of a related key detent release bar 62 associated with one of the three banks of special keys. The square studs 602 in the key channels serve to provide upper bearings or guides for the bars during their camming action. This construction is such that when upon depression of a special key the related bar 62 is forced upwardly it thereby causes the cam 601 to force the pin 600 and hence pawl 596 downwardly or clockwise (Fig. 19) thus causing the pin 597 in contact with projection 598 to lift the related pawl 589 or rock it counter-clockwise. Depression of three of the special keys, one in each bank, will in this way serve to disengage the ends 603 of three of the pawls 589 from the shoulders 588. The fourth pawl will be rocked to free the shaft by the turning of one of the cashiers locks 454 or 455. For this purpose the slide 461 which is shifted either up or down from normal, depending upon which lock is turned, carries a pin 604 which cooperates with an arm 605 joined by a sleeve 606 to the fourth of the pawls 596. Normally the pin fits into a depression in this arm but when the slide 461 is shifted in either direction the pin will be carried out of the depression and will cam the arm clockwise thereby depressing the fourth pawl 596 and rocking the fourth pawl 589 counter-clockwise to release the machine.

While it is thus rendered necessary to operate four separate elements in order to release the machine for the entry of an item, suitable coupling devices are employed for the purpose of tying these elements together during certain total taking operations to permit the release of the machine upon the operation of a single one of the elements such as any one of the keys in the three special banks or either of the cashiers locks. This construction is required by virtue of the fact that in taking the totals from any of the totalizers in the three groups of the universal carry type the total lever is moved to the "Read" position and the desired totalizer is selected by depression of the related special key, as already explained. Obviously if three keys had to be depressed to release the machine there would be confusion in the operation of the totalizer selecting mechanism.

The coupling mechanism comprises a shaft 607

(Figs. 18, 19 and 25) which is rocked upon movement of either of the total levers, as will be later explained. Movement of total lever X to either the "Read" or the "Read counters" position will serve to rock the shaft 607 a certain limited extent, whereas movement of this lever to any other position away from normal or movement of the other total lever Y to any position away from the normal add position will serve to rock the shaft 607 to a greater extent. Secured to the shaft, as by means of pins, are a pair of arms 608 (Fig. 25) provided with hubs 609 surrounding the shaft. A stud 610 having an enlarged head is carried by each arm. Slidably mounted by means of elongated slots 611 and 612 cooperating respectively with the shaft 607 and the studs 610 is a bail having a pair of side arms 613 and a cross bar 614. A pair of springs 615 connected at one end to extensions 616 of the arms 608 and at the other end to projections 617 formed on the arms 613 of the bail serves to hold the bail in the position shown in (Figs. 19 and 25) with relation to the arms 608; i. e. the lower ends of the elongated slots engage the shaft 607 and studs 610. Normally the cross bar 614 is above and to the front of a shoulder 618 formed on each of the locking pawls 589 and does not interfere with the individual movement of the latter. However, when the shaft 607 is turned slightly clockwise (Fig. 19) due to movement of the total lever X to the "Read" position the cross bar 614 is carried into the upper end 619 of a slot cut into each of the locking pawls 589. It will be apparent that with the cross bar in this position rocking of any one of the pawls 589 as by the depression of any one of the special keys will cause the shoulders 618 of the operated pawl to shift the bail downwardly on the shaft 607 and studs 610 (Fig. 25) against the tension of the springs 615. Now as the bail is slid downwardly it cooperates with the tails 620 of all of the remaining pawls 589 and rocks them along with the one that is rocked upon depression of the key.

If the shaft 607 is rocked a greater amount as by the movement of one of the total levers out of the add position and to some position other than "Read" or "Read counters" the cross bar 614 will be carried further into the slots formed in the locking pawls 589. The lower ends of these slots are cut at an angle so that a camming action is produced upon movement of the bar in this way to its full extent. This camming action is such as to rock all of the locking pawls to disengage the ends 603 from the shoulders 588 and thereby release the machine for operation without requiring the depression of a special key or the turning of a cashier's lock. Furthermore, the depression of such a key (i. e., a special key) or the turning of any of said locks is effectively prevented at this time by the cooperation of the nose of the cross bar with a face 621 formed on each of the pawls 596. Since operation of these pawls is a necessary incident to the operation of the keys and locks mentioned their accidental or intentional misoperation will be prevented. It is, of course, necessary that the sliding movement of the bail should be blocked in order to render this interlock positive and toward this end a finger 622 (Figs. 25 and 19) is formed on each of the arms of the bail and is adapted to cooperate with a fixed cross bar 623 whenever the shaft 607 is rocked to its full extent. This construction also serves to prevent movement of the total levers to any positions other than "Add," "Read" or "Read counter" after the bail has been slid forward by depression of a key in the manner above explained since under this condition the finger 622 will be above the fixed bar 623 so that further rocking of shaft 607 is prevented. It should be mentioned also that if any of the pawls 589 is rocked as by the depression of a special key while the total levers are both in their "Add" positions the shoulder 618 of such pawl will be carried under the cross bar 614 to prevent any subsequent rocking movement of the bail and hence any movement of either total lever.

When the machine is conditioned for the taking of totals from any of the totalizers or counters directly related to the banks of special keys, means which will now be described are effective to permit only the depression of a single key or the equivalent turning of one of the cashiers' locks. For this purpose there is provided a squared shaft or bar 624 having its ends formed as trunnions rotatable in the supporting frames 10 and 11. On this bar there is slidably mounted a series of blocking members 625 (Figs. 19 and 21) which have slots 626 cooperating with large headed pins or screws 627 in such a way as to permit a limited lateral sliding movement of the members. Normally these members are completely out of the path of the pawls 596 but when the square bar 624 is turned slightly counterclockwise (Fig. 19) they are carried into the path of movement of the ends 628 of the pawls. Rocking of the bar for this purpose is effected by means of a link 629 connected at one end to an arm 630 (Fig. 18) secured to shaft 607 and connected at its other end to an arm 631 secured to the bar. It will be clear that when the shaft 607 is turned as by the movement of the total lever X to the "Read" or "Read counters" position the members 625 will become effective to prevent operation of more than one of the pawls 596. The action of the members 625 is similar to that of ordinary single key mechanism and is such that the rocking of any one of the pawls 596 will wedge its end between the members 625 and take up all available movement of the latter so that no other pawl may be operated.

When the shaft 607 is rocked still further as upon movement of the total lever X to some other position or upon any movement of the lever Y the bar 624 will be rocked further but the relation of the members 625 and the pawls 596 will not be materially changed. At this time, however, as already explained, movement of all of the pawls 596 is blocked by cooperation of the faces 621 with the cross bar 614. If desired the lower edge of the ends of the pawls 596 could be so formed that upon this further rocking of the square bar 624 the member 625 would be forced between the pawls just enough to take up all of the loose play between the members and thus additionally prevent movement of the pawls.

In order to prevent the operation of any of the amount keys whenever either of the total levers is shifted out of the "Add" position each of the releasing bars 62 (Fig. 2) for these keys is provided with a cam formation 601 which cooperates with a pin 632 carried by a related hook element 633 loosely mounted on the shaft 595 and held in position by spring 634. A bail having arms 635 and a cross piece 636 is secured to the shaft 607 which is turned, as explained, by virtue of connections to be presently described upon movement of the total levers. If an amount key is depressed the hook element 633 related to its bank will be rocked to carry the shoulder 637 beneath the cross piece 636 and thus prevent any subsequent rocking of the bail 635 and hence any movement of the total levers. On the other hand, rocking of the shaft 607 to either of its extents of movement by shifting of either total lever will carry the cross piece 636 in front of all of the hook elements 633 and effectively prevent subsequent depression of any of the amount keys.

The means for rocking the shaft 607 in the manner indicated upon the movement of the total levers will now be explained. As best shown in Fig. 3 shaft 607 is provided at its left end with arms 638 which are drawn by a spring 639 in a clockwise direction (Fig. 3) to normally maintain the shaft in the position shown. These arms are secured together and pinned to the shaft 607 by means of a sleeve 640. Each of a pair of links 641 is connected at one end by means of a headed pin 642 and elongated slot 643 to one of the arms 638 while its opposite end is connected by direct pivotal connections to one of a pair of bell-cranks 644 (Fig. 23) and 645 (Fig. 24) loosely mounted on a stud 646. The rearwardly extending arms 647 and 648 of these bell-cranks are provided respectively with cam slots 649 and 650. Total lever X carries a roller 514 that cooperates with the slot 649 (Fig. 23) which is so formed that movement of the lever one or two steps toward the rear of the machine, i. e. to the "Read" or "Read counters" position will serve to rock the bell-crank 647 a slight amount so that through the link 641 (Fig. 3) and arm 638 it will rock the shaft 607 the partial extent which has been referred to. The slot 649 is so formed, furthermore, that movement of the lever to any other of its totaling positions will rock the bell-crank a further amount so as to rock the shaft 607 the full extent which has been mentioned. The slot 650 in the other bell-crank 648 (Fig. 24) which cooperates in a similar way with a roller 514 on the other total lever Y is so formed as to produce the full rocking of the shaft 607 upon any movement of the lever away from its normal add position.

In order to prevent a misoperation of the machine which might be occasioned by the turning of the reset lock and a subsequent release of the machine while the total levers are both in the "Add" position a special interlock is provided. For this purpose the lever 533, which is rocked upon turning of the reset lock, carries a pin 651 (Fig. 3) which normally holds a hook element 652, pivoted at 154, out of engagement with a locking shoulder 653 formed on a disk 654 secured to the shaft 37. When the lever 538 is rocked, however, due to turning of the lock the hook member is urged by a spring 655 (Fig. 3) to engage the shoulder 653 to lock the machine. A stud 656 carried by a rearward extension 657 of the hook member stands in rear of a pair of levers 516 which are rocked upon movement of the related total levers, by the action of roller 514 on total lever X in cam slot 515 of lever 516 or by the action of roller 514 on total lever Y in slot 515 of the other lever 516 (see Fig. 22). Therefore as either total lever is shifted in either direction from normal the stud 656 will be engaged by one or the other of the levers 516 to rock the hook element 652 to again release the machine so far as this element is concerned.

An interlock between the pair of total levers is also provided. This consists of a pair of arms 658 (Fig. 3) and 659 which are connected together by a sleeve which is journaled on a stud 661 extending from the frame 9 at a point in rear of the lower ends of the arms 518. Each arm carries a pin 662 which is in the path of movement of the arm 518 (Fig. 22) of the related bell-crank that is rocked upon movement of one of the total levers. This construction is such that only one of the arms 518 can be moved to a sufficient extent to permit movement of its related total lever to a totaling position. Thus if the arm 658 is rocked by engagement of its pin 662 by the arm 518 moved by total lever Y the other arm 659 will be forced against the other arm 518 which would have to be rocked upon movement of the other total lever X, thereby effectively locking the latter.

*Timing chart*

The timing chart (Fig. 30) illustrates graphically the sequence of operation of the major functions performed by the machine. The heavy lines used in this chart illustrate the period and duration of activity of movement of the operating parts while the light line portion of any circle designates the idle condition of the represented function. Sudden breaks in the heavy lines indicate the points at which the operating members change their direction of movement.

The key locking bar 52 is released 0° to 20° (circle 18), to hold all keys locked in either normal or depressed position. From 20° to 35°, circle 2, indicates operation of the differential units related to the special keys to select the proper totalizers, counters, and special indicator tablets according to the transaction, department and clerk keys depressed. From 35° to 45° the slides 370 holding out the totalizer engaging bails 364 are shifted to allow any of the bails, which have a series of notches in the bars 359, 472, 486, and 496 aligned below their cooperating fingers, to engage the related totalizer lifting frames preparatory to lifting them. During the interval from 45° to 60°, as shown by circles 4 and 5, the totalizers are lifted into mesh with the actuators when either a sub total or a reset or grand total is being taken. Movement of the actuators to the positions represented by the keys or the selected totalizer under the action of the positive differential mechanism, or by the aid of the spring levers 548, on totaling operations, next takes place between 60° and 155° (circle 7). If an item entering operation is being performed the totalizers are lifted into mesh with the actuators between 155° and 170° (circle 6).

If a reset total is being taken the totalizers will be carried out of mesh with the actuators between 175° to 185° (circle 4) while early during this period the rack detents (circle 9) will move in to keep the racks from jumping and will stay in this position while the racks are being restored. The detents engage the racks very quickly at about 173° before the totalizers are more than half out of mesh.

The actuators and other parts of the differential mechanism are restored to normal during the interval between 190° and 280° (circle 7). The totalizer wheels are actuated by this return movement of the actuators on an adding or a sub- total operation. Between 283° and 295° (circles 5 and 6), the totalizers and counters are taken out of mesh with the actuators and are engaged with the carry slides.

The slides 370 for rocking the totalizer engaging bails 364 are shifted back to normal during the interval from 335° to 345° (circle 3), to carry the cross fingers 363 of the bails out of the notches in the selecting bars 359 below, thus allowing the selecting mechanism, in the period from 345° to 360° (circle 2) to restore these bars and connections controlled by the special keys to normal position. The depressed keys are released late in the operation, 345° to 360° (circle 12).

Résumé

One suitable form of the invention having thus been described in detail the coordination of the several operative features will now be more clearly set out by a brief description of an operation of the machine as a whole.

Assuming that a customer of the store in which the machine is located has previously purchased a Victrola and is now about to make a payment of $7.50 on account to clerk B while cashier number 2 is on duty, the machine, in the first place, will be conditioned by the turning of cashier 2's lock 455 (Fig. 1) to designate her responsibility for the items entered. Total controlling levers X and Y (Fig. 10) will be located in their item entering positions. The knobs 714 will have been adjusted at the beginning of the day to indicate the date on certain of the printed records. Upon receipt of the money the cashier will depress the proper amount keys representing $7.50 and also the proper special keys representing the "Received on account" transaction, the clerk "B" and the "Victrola" department, all of these keys being held depressed by the detents described. Proper adjustment of one of the cashier's locks and depression of a key in each of the special banks will serve to release the machine for operation by withdrawing the set of four independent locking pawls 589 (Fig. 19) which cooperate with the operating shaft 37.

The main operating parts of the machine may now be turned either by means of a motor or by the hand operated lever 33. Depression of the "Received on account" key will have served to shift the slide 306 (Fig. 12) of its bank downwardly a distance of two steps. The slide 306 carries the stud 323 which will have been thus carried down two steps from normal. Similarly the "B" clerk's key will have served to shift its slide 307 upwardly one and one half steps so that the adjacent slide 306 will have been shifted upwardly three steps, thru the gears 311 and 312, thereby carrying its stud 323 up three steps from normal. Depression of the "Victrola" department key will likewise have shifted its slide 307 up one and one half steps and the related slide 306 together with its stud 323 up three steps.

Now upon the operation of the main shaft of the machine the shaft 324 (Fig. 12) together with arms 325 will be rocked clockwise very early to carry the rod 326 and hence the cam plates 329 upwardly. The jaws 331 of the latter cooperating with the several studs 323 will have caused the segments 330 to rock and the rack bars 342 to slide and thereby turn the shafts 348, 349 and 350 to extents corresponding to the special keys depressed. These shafts will adjust the totalizer selecting bars 359 in the several banks of totalizers. Similar selecting bars will have been positioned in certain of the totalizer banks under control of the two totaling levers and the cashiers' locks. The net result of the movement of all of these bars will be to align a series of notches or depressions in all in the path of the cross fingers of bails 364 related to the following totalizers: "Cashier 2 net cash," "Total net cash," "Cashier 2 money in" and "Received on account" as well as the bails related to the "Received on account" item counter, and cashier 2's item counter. For all other totalizers and counters there will be a high portion of at least one of the selecting bars in the path of the bails 364.

Now as the operation continues the series of cam slides 370 (Fig. 5) will be shifted toward the front of the machine and will permit the bails or latching plates 364 related to the particular totalizers and counters enumerated above to be rocked to engage their notches 374 with the rods 375 carried by the totalizer lifting toggle links 377. Upon the continued operation of the machine up to the mid point of the cycle the several bars 378 will be shifted toward the right (Fig. 5) and all of the toggle links 377 will be straightened out to a certain extent, thereby causing all of the rods 375 to be raised. Obviously those totalizers whose bails or latch plates have been rocked to engage their notches 374 with the rods will be lifted into mesh with the differential actuators 162.

Prior to the engaging movement of the totalizers, as explained, the differential operating frames 138 (Fig. 2) will begin to rock and through the gearing associated therewith will tend to cause the slides 130 to be moved upwardly and the slides 131 to be moved downwardly. In those banks where no keys have been depressed the slides 130 will be barred from any upward movement by means of the zero stops 120 while the complemental slides 131 will partake of the full nine steps of downward movement. In the dollars bank, however, the zero stop will have been raised and the slide 130 will be permitted to move upwardly 7 steps until the lug 134 engages the depressed 7 key while the complemental slide 131 will move downwardly 2 steps until its lug 135 engages the opposite side of the 7 key. Similarly the dimes slide 130 will move upwardly 5 steps while its complemental slide will move downwardly 4 steps. Subsequently, after the selected totalizers have been lifted into mesh with the actuators which have been shifted to the same extents as the slide 130, the frames 138 will be restored and will return the actuators 162 as well as the slides 130 and 131 to their normal positions.

This movement of the differential elements will have served to enter the $7.50 amount into those totalizers which were raised in the manner previously explained.

When it is desired to take totals one of the levers X and Y (Fig. 10) must be shifted to some position depending upon the totalizer desired. If the total is to be taken from one of the totalizers in the three universal carry banks the slide 475 related to the lever X will be shifted one step up. This will rock the bail 614 (Fig. 19) clockwise to a slight extent by the connections shown in Fig. 3 for rocking the shaft 607 so that if any one of the pawls 589 should be rocked all four of the latter will be moved in unison. The purpose of this is to enable the release of the machine by depression of a single one of the special keys or turning of one of the cashier's locks instead of requiring depression of a key in each bank and the turning of a cashier's lock as in item entering operations. At the same time the single-key frame 624 will be rocked to a position wherein it will prevent depression of more than a single one of the special keys or the corresponding turning of a cashier's lock.

Should the lever X be shifted to any of the remaining seven positions it will serve to shift the connected totalizer selecting slides 486 to such positions that only the particular totalizer corresponding to any definite position will be selected for engagement with the racks. At the same time such movement of the lever X will, due to the form of the slot 649 (Fig. 3) in the arm 657, serve to rock the shaft 607 and hence the bail 614 (Fig. 19) an additional amount which is sufficient to carry it to the bottom of the slots 619. In moving to this position the bail will serve to rock all of the locking pawls 589 to free the shaft 37 and at the same time it will be carried into the path of the arms 596 and hence will lock the special keys against depression and the cashiers' locks against turning. In other respects the operation of the machine will be substantially the same as when the lever X is placed in the "Read" position.

Movement of the lever Y to any of the nine positions away from normal will produce the same effect as explained above with respect to the seven last described positions of the lever X. For each of these positions there will be selected a definite totalizer for totaling purposes, the selection being effected under control of the selecting bars 496 and not being interfered with by any of the other selecting bars. Upon movement of the lever Y to any of its nine shifted positions the bail 614 (Fig. 19) will be rocked to release the shaft 37 from the four pawls 589 and to lock up all of the special keys and the cashiers' locks. Arms 518 (Fig. 22) of levers 516 cooperating with the arms 658 and 659 (Fig. 3) insure that only one of the levers X and Y may be shifted out of the "Add" position.

In order to prevent operation of the machine with the levers X or Y in their "Add" positions and the reset lock 474 turned to reset position the special locking hook 652 (Fig. 3) comes into play upon turning of the lock. This prevents operation of the shaft 37 until the hook is again raised by the action of one of the arms 516 upon the pin 656 carried by the rear arm 657 of the hook whenever one of the levers X and Y is shifted.

While one admirable form of the present invention disclosing its many novel and improved features has been disclosed herein, it is to be understood that numerous modifications may be made in the specific constructions illustrated and described without departing from the spirit or scope of the invention. Not only is it contemplated that changes may be made in the specific mechanisms provided for the accomplishment of various functions but if desired parts may be omitted or rearranged to bring about variations in the results effected. It is not desired to be limited other than by the scope of the claims which follow.

What I claim is:

1. In a cash register, a main operating mechanism, a plurality of sets of depressible selection keys, a plurality of devices for locking up the main operating mechanism, each of said devices being controlled by a respective set of said keys, a plurality of manipulative members, each capable of being in at least three positions, and means positioned by one of said members to at least three positions, said means being locked in one position by movement of any of said locking devices to ineffective position while upon movement of said means to another position said means serves to couple all of said devices for simultaneous operation by the operation of any one by said keys, and upon movement to a third position said means simultaneously moves all of said locking devices to ineffective position and locks all of said keys.

2. In a machine of the class described, a plurality of manipulative total control levers each having a normal add position, a main operating mechanism, a reset control lever having a normal add position, a lock for controlling said reset control lever, normally inoperative means rendered operative for locking up the main operating mechanism under control of said lock controlled reset control lever when moved out of normal position, and devices under control of said manipulative total control levers for rendering said operating mechanism locking means inoperative on movement of any one of said manipulative total control levers out of normal position.

3. In a machine of the class described, the combination of a plurality of sets of selecting keys, a main operating device, means normally effective comprising a plurality of locking pawls serving when in effective position to prevent operation of the main operating device, connections intermediate each of said sets of selecting keys and said respective locking pawls so arranged that the operation of a key in any bank will release the locking pawl associated with said bank of keys, which connections include pawl operating devices one for each pawl, and an adjustable single member mechanism which is normally ineffective but which may at times be moved to a position relative to said pawl operating devices where said single member mechanism prevents the operation of more than one pawl operating device.

4. In a machine of the class described, the combination of a plurality of selecting keys, a main operating device, means normally effective comprising a plurality of locking pawls serving when in effective position to prevent operation of the main operating device, connections intermediate each of said sets of selecting keys and said respective locking pawls so arranged that the operation of a key in any bank will move the locking pawl associated with said bank of keys to ineffective position, and an adjustable coupling member so associated with said pawls that when in normal position it does not cooperate with said locking pawls but when adjusted to a certain extent it couples all of said locking pawls so that all of said locking pawls are moved to ineffective position when one locking pawl is moved to ineffective position by the setting of a selecting key, and when said coupling member is pivotally adjusted to a further extent it moves all of said locking pawls to ineffective position.

WILLIAM S. GUBELMANN.